(12) United States Patent
Partovi et al.

(10) Patent No.: US 8,629,652 B2
(45) Date of Patent: *Jan. 14, 2014

(54) POWER SOURCE, CHARGING SYSTEM, AND INDUCTIVE RECEIVER FOR MOBILE DEVICES

(75) Inventors: Afshin Partovi, Sunnyvale, CA (US); Michael Sears, Ben Lomond, CA (US)

(73) Assignee: Mojo Mobility, Inc., Sunnyvale, CA (US)

( * ) Notice: Subject to any disclaimer, the term of this patent is extended or adjusted under 35 U.S.C. 154(b) by 26 days.

This patent is subject to a terminal disclaimer.

(21) Appl. No.: 13/113,977

(22) Filed: May 23, 2011

(65) Prior Publication Data

US 2012/0126745 A1 May 24, 2012

Related U.S. Application Data

(63) Continuation of application No. 11/757,067, filed on Jun. 1, 2007, now Pat. No. 7,948,208.

(60) Provisional application No. 60/810,262, filed on Jun. 1, 2006, provisional application No. 60/810,298, filed on Jun. 1, 2006, provisional application No. 60/868,674, filed on Dec. 5, 2006.

(51) Int. Cl.
   *H02J 7/00* (2006.01)
(52) U.S. Cl.
   USPC .......................................................... 320/108
(58) Field of Classification Search
   USPC .......................................................... 320/108
   See application file for complete search history.

(56) References Cited

U.S. PATENT DOCUMENTS

| 3,938,018 A | 2/1976 | Dahl |
| 4,311,853 A | 1/1982 | Cree |
| 4,311,953 A | 1/1982 | Fukuda |
| 4,415,959 A | 11/1983 | Vinciarelli |
| 4,731,585 A | 3/1988 | Fox |

(Continued)

FOREIGN PATENT DOCUMENTS

| JP | 2006-500894 A | 1/2006 |
| JP | 200624633 | 9/2006 |

(Continued)

OTHER PUBLICATIONS

Sakamoto, et al., "A Novel Circuit for Non-Contact Charging Through Electro-Magnetic Coupling", 1992, IEEE, pp. 165-174.

(Continued)

*Primary Examiner* — Edward Tso
*Assistant Examiner* — Robert Grant
(74) *Attorney, Agent, or Firm* — Fliesler Meyer LLP

(57) ABSTRACT

A power source, charging system, and inductive receiver for mobile devices. A pad or similar base unit comprises a primary, which creates a magnetic field by applying an alternating current to a winding, coil, or any type of current carrying wire. A receiver comprises a means for receiving the energy from the alternating magnetic field and transferring it to a mobile or other device. The receiver can also comprise electronic components or logic to set the voltage and current to the appropriate levels required by the mobile device, or to communicate information or data to and from the pad. The system may also incorporate efficiency measures that improve the efficiency of power transfer between the charger and receiver.

30 Claims, 11 Drawing Sheets

(56) References Cited

U.S. PATENT DOCUMENTS

| | | | |
|---|---|---|---|
| 4,800,328 A | 1/1989 | Bolger et al. | |
| 4,873,677 A | 10/1989 | Sakamoto | |
| 5,237,257 A | 8/1993 | Johnson et al. | |
| 5,367,242 A | 11/1994 | Hulman | |
| 5,434,493 A | 7/1995 | Woody et al. | |
| 5,543,702 A | 8/1996 | Pfeiffer | |
| 5,550,452 A | 8/1996 | Shirai | |
| 5,600,225 A | 2/1997 | Goto | |
| 5,642,087 A | 6/1997 | Crow | |
| 5,656,917 A | 8/1997 | Theobald | |
| 5,696,433 A | 12/1997 | Patino | |
| 5,734,254 A | 3/1998 | Stephens | |
| 5,744,933 A | 4/1998 | Inoue et al. | |
| 5,889,384 A | 3/1999 | Hayes et al. | |
| 5,925,814 A | 7/1999 | Tsuzuki et al. | |
| 5,952,814 A | 9/1999 | Van Lerbergne | |
| 5,959,433 A * | 9/1999 | Rohde | 320/108 |
| 5,963,012 A | 10/1999 | Garcia | |
| 5,991,170 A | 11/1999 | Nagai | |
| 5,991,665 A | 11/1999 | Wang et al. | |
| 6,008,622 A | 12/1999 | Nakawatase | |
| 6,016,046 A | 1/2000 | Kaite | |
| 6,040,680 A | 3/2000 | Toya | |
| 6,094,119 A | 7/2000 | Reznik et al. | |
| 6,184,651 B1 | 2/2001 | Fernandez | |
| 6,184,654 B1 | 2/2001 | Bachner | |
| 6,208,115 B1 | 3/2001 | Binder | |
| 6,301,128 B1 | 10/2001 | Jang | |
| 6,310,465 B2 | 10/2001 | Najima | |
| 6,331,744 B1 | 12/2001 | Chen | |
| 6,436,299 B1 | 8/2002 | Baarman | |
| 6,462,509 B1 | 10/2002 | Abe | |
| 6,489,745 B1 | 12/2002 | Koreis | |
| 6,498,455 B2 | 12/2002 | Zink et al. | |
| 6,501,364 B1 | 12/2002 | Hui | |
| 6,573,817 B2 | 6/2003 | Gottschalk | |
| 6,586,909 B1 | 7/2003 | Trepka | |
| 6,625,477 B1 | 9/2003 | Wakefield | |
| 6,636,017 B2 | 10/2003 | Zink et al. | |
| 6,650,088 B1 | 11/2003 | Webb | |
| 6,673,250 B2 | 1/2004 | Kuennen | |
| 6,697,272 B2 | 2/2004 | Nanbu | |
| 6,731,071 B2 | 5/2004 | Baarman | |
| 6,741,064 B2 | 5/2004 | Liu | |
| 6,756,765 B2 | 6/2004 | Bruning | |
| 6,798,716 B1 | 9/2004 | Charych | |
| 6,803,744 B1 | 10/2004 | Sabo | |
| 6,803,774 B2 | 10/2004 | Park | |
| 6,806,649 B2 | 10/2004 | Mollema | |
| 6,812,645 B2 | 11/2004 | Baarman | |
| 6,825,620 B2 | 11/2004 | Kuennen | |
| 6,831,417 B2 | 12/2004 | Baarman | |
| 6,844,702 B2 | 1/2005 | Giannopoulos et al. | |
| 6,870,089 B1 | 3/2005 | Gray | |
| 6,888,438 B2 | 5/2005 | Hui | |
| 6,906,495 B2 * | 6/2005 | Cheng et al. | 320/108 |
| 6,913,477 B2 | 7/2005 | Dayan | |
| 6,917,163 B2 | 7/2005 | Baarman | |
| 6,917,182 B2 | 7/2005 | Burton | |
| 6,943,733 B2 | 9/2005 | Vance | |
| 6,972,543 B1 | 12/2005 | Wells | |
| 6,975,198 B2 | 12/2005 | Baarman | |
| 7,026,789 B2 | 4/2006 | Bozzone | |
| 7,031,662 B2 | 4/2006 | Suzuki | |
| 7,042,196 B2 | 5/2006 | Cheng | |
| 7,116,200 B2 | 10/2006 | Baarman | |
| 7,118,240 B2 | 10/2006 | Baarman | |
| 7,126,450 B2 | 10/2006 | Baarman | |
| 7,132,918 B2 | 11/2006 | Baarman | |
| 7,151,357 B2 | 12/2006 | Xian et al. | |
| 7,162,264 B2 | 1/2007 | Vance | |
| 7,164,245 B1 | 1/2007 | Chen | |
| 7,164,255 B2 * | 1/2007 | Hui | 320/108 |
| 7,183,870 B2 | 2/2007 | Takagi | |
| 7,184,706 B2 | 2/2007 | Someya | |
| 7,209,084 B2 | 4/2007 | Lindell | |
| 7,211,986 B1 | 5/2007 | Flowerdew et al. | |
| 7,221,919 B2 | 5/2007 | Takagi | |
| 7,239,110 B2 | 7/2007 | Cheng et al. | |
| 7,248,017 B2 | 7/2007 | Cheng et al. | |
| 7,305,258 B2 | 12/2007 | Rydgren | |
| 7,311,526 B2 | 12/2007 | Rohrbach | |
| 7,324,051 B2 | 1/2008 | Hayes | |
| 7,342,539 B2 | 3/2008 | Rosenberg | |
| 7,352,567 B2 | 4/2008 | Hotelling | |
| 7,355,150 B2 | 4/2008 | Baarman | |
| 7,376,408 B2 | 5/2008 | Hayes | |
| 7,378,817 B2 | 5/2008 | Calhoon et al. | |
| 7,382,636 B2 | 6/2008 | Baarman | |
| 7,385,357 B2 | 6/2008 | Kuennen | |
| 7,388,543 B2 | 6/2008 | Vance | |
| 7,399,202 B2 | 7/2008 | Dayan | |
| 7,415,248 B2 | 8/2008 | Andersson | |
| 7,443,135 B2 * | 10/2008 | Cho | 320/108 |
| 7,462,951 B1 | 12/2008 | Baarman | |
| 7,477,195 B2 | 1/2009 | Vance | |
| 7,487,921 B2 | 2/2009 | Takahashi | |
| 7,495,414 B2 | 2/2009 | Hui | |
| 7,498,871 B2 | 3/2009 | Ruuswik | |
| 7,525,283 B2 | 4/2009 | Cheng et al. | |
| 7,554,316 B2 | 6/2009 | Stevens et al. | |
| 7,576,514 B2 | 8/2009 | Hui | |
| 7,605,496 B2 | 10/2009 | Stevens et al. | |
| D603,603 S | 11/2009 | Laine et al. | |
| D607,879 S | 1/2010 | Ferber et al. | |
| 7,645,143 B2 | 1/2010 | Rohrbach | |
| D611,407 S | 3/2010 | Webb | |
| D611,408 S | 3/2010 | Ferber et al. | |
| 7,741,734 B2 | 6/2010 | Joannopoulos et al. | |
| 7,781,916 B2 | 8/2010 | Boys | |
| D624,316 S | 9/2010 | Ferber et al. | |
| 7,804,054 B2 | 9/2010 | Shalom | |
| D625,721 S | 10/2010 | Ferber et al. | |
| 7,825,543 B2 | 11/2010 | Karalis et al. | |
| 7,855,529 B2 | 12/2010 | Liu | |
| 7,872,445 B2 | 1/2011 | Hui | |
| 7,906,936 B2 | 3/2011 | Azancot et al. | |
| 7,915,858 B2 | 3/2011 | Liu et al. | |
| D636,333 S | 4/2011 | Kulikowski | |
| 7,948,208 B2 * | 5/2011 | Partovi et al. | 320/108 |
| 7,952,322 B2 * | 5/2011 | Partovi et al. | 320/108 |
| D639,734 S | 6/2011 | Ferber et al. | |
| 8,035,255 B2 | 10/2011 | Kurs et al. | |
| 8,040,103 B2 | 10/2011 | Hui et al. | |
| 8,049,370 B2 | 11/2011 | Azancot et al. | |
| 8,050,068 B2 | 11/2011 | Hussmann et al. | |
| 8,169,185 B2 | 5/2012 | Partovi et al. | |
| 2002/0004167 A1 | 1/2002 | Jenson et al. | |
| 2002/0067238 A1 | 6/2002 | Leu | |
| 2002/0089305 A1 | 7/2002 | Park et al. | |
| 2002/0093309 A1 | 7/2002 | Peele | |
| 2003/0094921 A1 | 5/2003 | Lau et al. | |
| 2003/0103039 A1 | 6/2003 | Burr et al. | |
| 2003/0210106 A1 | 11/2003 | Cheng | |
| 2003/0214255 A1 | 11/2003 | Baarman | |
| 2004/0113589 A1 | 6/2004 | Crisp | |
| 2004/0130915 A1 | 7/2004 | Baarman | |
| 2004/0130916 A1 | 7/2004 | Baarman | |
| 2004/0145342 A1 * | 7/2004 | Lyon | 320/108 |
| 2004/0150934 A1 | 8/2004 | Baarman | |
| 2004/0222751 A1 | 11/2004 | Mollema | |
| 2004/0232845 A1 | 11/2004 | Baarman | |
| 2005/0007067 A1 | 1/2005 | Baarman | |
| 2005/0017677 A1 | 1/2005 | Burton | |
| 2005/0063488 A1 | 3/2005 | Troyk et al. | |
| 2005/0075696 A1 | 4/2005 | Forsberg et al. | |
| 2005/0093475 A1 | 5/2005 | Kuennen | |
| 2005/0116650 A1 | 6/2005 | Baarman | |
| 2005/0116683 A1 | 6/2005 | Cheng | |
| 2005/0122058 A1 | 6/2005 | Baarman | |
| 2005/0122059 A1 | 6/2005 | Baarman | |
| 2005/0127849 A1 | 6/2005 | Baarman | |
| 2005/0127850 A1 | 6/2005 | Baarman | |
| 2005/0127867 A1 | 6/2005 | Calhoon et al. | |

(56) References Cited

U.S. PATENT DOCUMENTS

| | | |
|---|---|---|
| 2005/0127869 A1* | 6/2005 | Calhoon et al. ............... 320/108 |
| 2005/0135122 A1 | 6/2005 | Cheng |
| 2005/0140482 A1 | 6/2005 | Cheng |
| 2005/0162125 A1 | 7/2005 | Yu |
| 2005/0189910 A1* | 9/2005 | Hui ............................ 320/108 |
| 2006/0021926 A1 | 2/2006 | Woodard |
| 2006/0038794 A1* | 2/2006 | Shneidman ................. 345/173 |
| 2006/0108977 A1 | 5/2006 | Kagermeier |
| 2006/0132045 A1 | 6/2006 | Baarman |
| 2006/0146517 A1 | 7/2006 | Park |
| 2006/0202665 A1 | 9/2006 | Hsu |
| 2006/0205381 A1 | 9/2006 | Beart et al. |
| 2006/0238930 A1 | 10/2006 | Baarman et al. |
| 2006/0284593 A1 | 12/2006 | Nagy |
| 2007/0029965 A1 | 2/2007 | Hui |
| 2007/0069687 A1 | 3/2007 | Suzuki |
| 2007/0109708 A1 | 5/2007 | Hussman et al. |
| 2007/0139000 A1 | 6/2007 | Kozuma et al. |
| 2007/0178945 A1 | 8/2007 | Cook et al. |
| 2007/0182367 A1 | 8/2007 | Partovi |
| 2007/0279002 A1 | 12/2007 | Partovi |
| 2007/0296393 A1 | 12/2007 | Malpas et al. |
| 2008/0014897 A1 | 1/2008 | Cook et al. |
| 2008/0067874 A1 | 3/2008 | Tseng |
| 2008/0164839 A1 | 7/2008 | Kato |
| 2008/0247210 A1 | 10/2008 | Hu |
| 2008/0258679 A1 | 10/2008 | Manico |
| 2008/0272889 A1 | 11/2008 | Symons |
| 2008/0278264 A1 | 11/2008 | Karalis et al. |
| 2009/0015075 A1 | 1/2009 | Cook |
| 2009/0033564 A1 | 2/2009 | Cook |
| 2009/0043727 A1 | 2/2009 | Cohen, Jr. et al. |
| 2009/0058189 A1 | 3/2009 | Cook et al. |
| 2009/0072627 A1 | 3/2009 | Cook et al. |
| 2009/0072628 A1 | 3/2009 | Cook et al. |
| 2009/0072629 A1 | 3/2009 | Cook et al. |
| 2009/0079268 A1 | 3/2009 | Cook et al. |
| 2009/0096413 A1 | 4/2009 | Partovi et al. |
| 2009/0102292 A1 | 4/2009 | Cook et al. |
| 2009/0127937 A1 | 5/2009 | Widmer et al. |
| 2009/0134712 A1 | 5/2009 | Cook et al. |
| 2009/0167449 A1 | 7/2009 | Cook et al. |
| 2009/0195332 A1 | 8/2009 | Joannopoulos et al. |
| 2009/0195333 A1 | 8/2009 | Joannopoulos et al. |
| 2009/0212636 A1 | 8/2009 | Cook et al. |
| 2009/0213028 A1 | 8/2009 | Cook et al. |
| 2009/0224608 A1 | 9/2009 | Cook et al. |
| 2009/0224609 A1 | 9/2009 | Cook et al. |
| 2009/0224856 A1 | 9/2009 | Karalis et al. |
| 2009/0243397 A1 | 10/2009 | Cook et al. |
| 2009/0257259 A1 | 10/2009 | Leibovitz |
| 2009/0267709 A1 | 10/2009 | Joannopoulos et al. |
| 2009/0267710 A1 | 10/2009 | Joannopoulos et al. |
| 2009/0284083 A1 | 11/2009 | Karalis et al. |
| 2009/0284227 A1 | 11/2009 | Mohammadian et al. |
| 2010/0007307 A1 | 1/2010 | Baarman et al. |
| 2010/0038970 A1 | 2/2010 | Cook et al. |
| 2010/0066176 A1 | 3/2010 | Azancot |
| 2010/0070219 A1 | 3/2010 | Azancot |
| 2010/0072825 A1 | 3/2010 | Azancot |
| 2010/0073177 A1 | 3/2010 | Azancot |
| 2010/0081473 A1 | 4/2010 | Chatterjee et al. |
| 2010/0096934 A1 | 4/2010 | Joannopoulos et al. |
| 2010/0102639 A1 | 4/2010 | Joannopoulos et al. |
| 2010/0102640 A1 | 4/2010 | Joannopoulos et al. |
| 2010/0102641 A1 | 4/2010 | Joannopoulos et al. |
| 2010/0109443 A1 | 5/2010 | Cook et al. |
| 2010/0109445 A1 | 5/2010 | Kurs et al. |
| 2010/0117454 A1 | 5/2010 | Cook et al. |
| 2010/0117455 A1 | 5/2010 | Joannopoulos et al. |
| 2010/0117456 A1 | 5/2010 | Karalis et al. |
| 2010/0123353 A1 | 5/2010 | Joannopoulos et al. |
| 2010/0123354 A1 | 5/2010 | Joannopoulos et al. |
| 2010/0123355 A1 | 5/2010 | Joannopoulos et al. |
| 2010/0127573 A1 | 5/2010 | Joannopoulos et al. |
| 2010/0127574 A1 | 5/2010 | Joannopoulos et al. |
| 2010/0127575 A1 | 5/2010 | Joannopoulos et al. |
| 2010/0127660 A1 | 5/2010 | Cook et al. |
| 2010/0133918 A1 | 6/2010 | Joannopoulos et al. |
| 2010/0133919 A1 | 6/2010 | Joannopoulos et al. |
| 2010/0133920 A1 | 6/2010 | Joannopoulos et al. |
| 2010/0141042 A1 | 6/2010 | Kesler et al. |
| 2010/0148589 A1 | 6/2010 | Hamam et al. |
| 2010/0164296 A1 | 7/2010 | Kurs et al. |
| 2010/0164297 A1 | 7/2010 | Kurs et al. |
| 2010/0164298 A1 | 7/2010 | Karalis et al. |
| 2010/0171368 A1 | 7/2010 | Schatz et al. |
| 2010/0181841 A1 | 7/2010 | Azancot |
| 2010/0181843 A1 | 7/2010 | Schatz et al. |
| 2010/0181845 A1 | 7/2010 | Fiorello et al. |
| 2010/0184371 A1 | 7/2010 | Cook et al. |
| 2010/0187911 A1 | 7/2010 | Joannopoulos et al. |
| 2010/0190435 A1 | 7/2010 | Cook et al. |
| 2010/0190436 A1 | 7/2010 | Cook et al. |
| 2010/0194336 A1 | 8/2010 | Azancot |
| 2010/0201313 A1 | 8/2010 | Vorenkamp et al. |
| 2010/0207572 A1 | 8/2010 | Kirby et al. |
| 2010/0207771 A1 | 8/2010 | Trigiani |
| 2010/0213895 A1 | 8/2010 | Keating et al. |
| 2010/0219183 A1 | 9/2010 | Azancot |
| 2010/0219693 A1 | 9/2010 | Azancot |
| 2010/0219697 A1 | 9/2010 | Azancot |
| 2010/0219698 A1 | 9/2010 | Azancot |
| 2010/0244584 A1 | 9/2010 | Azancot |
| 2010/0253281 A1 | 10/2010 | Li |
| 2010/0253282 A1 | 10/2010 | Azancot |
| 2010/0257382 A1 | 10/2010 | Azancot |
| 2010/0259401 A1 | 10/2010 | Azancot |
| 2010/0277120 A1 | 11/2010 | Cook et al. |
| 2010/0277121 A1 | 11/2010 | Hall et al. |
| 2010/0327804 A1 | 12/2010 | Takahashi et al. |
| 2011/0012556 A1 | 1/2011 | Lai |
| 2011/0057606 A1 | 3/2011 | Saunamaki |
| 2011/0062793 A1 | 3/2011 | Azancot et al. |
| 2011/0090723 A1 | 4/2011 | Hu et al. |
| 2011/0095617 A1 | 4/2011 | Cook et al. |
| 2011/0121660 A1 | 5/2011 | Azancot et al. |
| 2011/0157137 A1 | 6/2011 | Ben-Shalom |
| 2011/0187318 A1 | 8/2011 | Hui et al. |
| 2011/0217927 A1 | 9/2011 | Ben-Shalom et al. |
| 2011/0221387 A1 | 9/2011 | Steigerwald et al. |
| 2011/0221391 A1 | 9/2011 | Won et al. |
| 2011/0266878 A9 | 11/2011 | Cook et al. |

FOREIGN PATENT DOCUMENTS

| | | |
|---|---|---|
| JP | 408000838 | 11/2011 |
| WO | WO/03/096361 | 11/2003 |
| WO | WO03096512 A2 | 11/2003 |
| WO | WO/03/105311 | 12/2003 |
| WO | WO03105308 A1 | 12/2003 |
| WO | WO2004030176 | 4/2004 |
| WO | WO2004038887 | 5/2004 |
| WO | WO2004038888 | 5/2004 |
| WO | WO2004055654 | 7/2004 |
| WO | WO2005024865 | 3/2005 |
| WO | WO2005109597 | 11/2005 |
| WO | WO2005109598 A1 | 11/2005 |
| WO | 2008-137996 | 11/2008 |

OTHER PUBLICATIONS

Abe, et al., "A Non-Contact Charger Using a Resonant Converter with Parallel Capacitor of the Secondary Coil", Apr. 2000, IEEE, vol. 36, No. 2, pp. 444-451.

Sakamoto, et al. "Large Air-Gap Coupler for Inductive Charger", Sep. 1999, IEEE, vol. 35, No. 5, pp. 3526-3528.

Sakamoto, et al. "A Novel Converter for Non-Contact Charging with Electromagnetic Coupling", Nov. 1993, IEEE, vol. 29, No. 6, pp. 3228-3230.

Kim, et al. "Design of a Contactless Battery Charger for Cellular Phone", Dec. 2001, IEEE, vol. 48, No. 6, pp. 1238-1247.

(56) References Cited

OTHER PUBLICATIONS

Hui, et al. "Coreless Printed-Circuit Board Transformers for Signal and Energy Transfer", Electronics Letters, May 1998, vol. 34, No. 11, pp. 1052-1054.

Hui, et al. "Optimal Operation of Coreless PCB Transformer-Isolated Gate Drive Circuits with Wide Switching Frequency Range", May 1999, IEEE Transactions of Power Electronics, vol. 14, No. 3, pp. 506-514.

Tang, et al. "Characterization of Coreless Printed Circuit Board (PCB) Transformers", Nov. 2000, IEEE Transactions of Power Electronics, vol. 15, No. 6, pp. 1275-1282.

Tang, et al. "Coreless Printed Circuit Board (PCB) Transformers with Multiple Secondary Windings for Complementary Gate Drive Circuits", May 1999, IEEE Transactions of Power Electronics, vol. 14, No. 3, pp. 431-437.

Tang, et al. "Coreless Printed Circuit Board (PCB) Transformers with High Power Density and High Efficiency", May 2000, Electronics Letters, vol. 36, No. 11, pp. 943-944.

Borenstein, "Man Tries Wirelessly Boosting Batteries", Nov. 2006, USA Today, http://www.usatoday.com/tech/wireless/data/2006-11-16-wireless-recharging_x.htm, 5 pages.

Murph, "WildCharger Charges Your Gadgetry Sans Wires", Dec. 2006, Misc. Gadgets, 2 pages.

Gizmo Watch, "Pitstop: A Table Top Recharging Solution by Belkin", http://www.gizmowatch.com/entry/pitstop-a-table-top-recharging-solution-by-belkin, Dec. 2006, 5 pages.

Unknown Author, "Cutting the Cord", Apr. 2007, The Economist, 1 page.

Bishop, "Microsoft Surface Brings Computing to the Table", May 2007, http://seattlepi.nwsource.com/business/317737_msftdevic30.html, 7 pages.

Wildcharge, "The Wire-Free Power Revolution is Only Days Away, and WildCharge, Inc. is Leading the Charge", Sep. 2007, 3 pages.

PCT International Search Report dated Feb. 14, 2008 in re International Application No. PCT/US07/61406, 8 pages.

PCT International Search Report dated Aug. 8, 2008 re: PCT Application No. PCT/US08/63084, 8 pages.

WildCharge Life Unplugged!, http://www.wildcharge.com/, Apr. 17, 2009, 2 pages.

Powermat "The Future of Wireless Power Has Arrived", http://www.pwrmat.com, Apr. 15, 2009, 2 pages.

eCoupled Wireless Power Technology Fulton Innovation, http://www.ecoupled.com, Apr. 15, 2009, 5 pages.

eCoupled Wireless Power Technology Patents Fulton Innovation, http://www.ecoupled.com, Apr. 15, 2009, 4 pages.

Qualcomm Products and Services—Wireless Airlink Technologies, http://www.qualcomm.com/products_services/airlinks, Apr. 15, 2009, 3 pages.

Economist.com Science Technology Quarterly, "Wireless Charging", http://www.economist.com/science/tq/PrinterFriendly.cfm?story_id=13174387, Apr. 15, 2009, 4 pages.

Office Action in connection with U.S. Appl. No. 11/669,113 dated Oct. 29, 2008, 29 pages.

Final Office Action in connection wtih U.S. Appl. No. 11/669,113 dated Aug. 25, 2009, 25 pages.

Office Action in connection with U.S. Appl. No. 11/669,113 dated May 13, 2010, 22 pages.

International Search Report and Written Opinion of the International Searching Authority, Korean Intellectual Property Office, in re International Application No. PCT/US2010/032845 dated Dec. 13, 2010, 10 pages.

Office Action in connection with U.S. Appl. No. 11/757,067 dated Jan. 26, 2009, 26 pages.

Office Action in connection with U.S. Appl. No. 11/757,067 dated Oct. 19, 2009, 23 pages.

Office Action in connection with U.S. Appl. No. 11/757,067 dated May 10, 2010, 21 pages.

Office Action in connection with U.S. Appl. No. 12/116,876 dated May 2, 2011, 8 pages.

Hui, "A New Generation of Universal Contactless Battery Charging Platform for Portable Consumer Electronic Equipment", IEEE Transactions on Power Electronics, vol. 20, No. 3, May 2005, pp. 620-627, 8 pages.

Tang, et al., "Evaluation of the Shielding Effects on Printed-Circuit-Board Transformers Using Ferrite Plates and Copper Sheets", IEEE Transactions on Power Electronics, vol. 17, No. 6, Nov. 2002, pp. 1080-1088, 9 pages.

Liu, et al., "An Analysis of a Double-Layer Electromagnetic Shield for a Universal Contactless Battery Charging Platform", Department of Electronic Engineering City University of Hong Kong, IEEE, 2005, pp. 1767-1772, 6 pages.

Liu, et al., Equivalent Circuit Modeling of a Multilayer Planar Winding Array Structure for Use in a Universal Contactless Battery Charging Platform, IEEE Transactions on Power Electronics, vol. 22, No. 1, Jan. 2007, pp. 21-29, 9 pages.

Liu, et al., "Simulation Study and Experimental Verification of a Universal Contactless Battery Charging Platform with Localized Charging Features", IEEE Transactions on Power Electronics, vol. 22, No. 6, Nov. 2007, pp. 2202-2210, 9 pages.

Liu, et al., "Optimal Design of a Hybrid Winding Structure for Planar Contactless Battery Charging Platform", IEEE Transactions on Power Electronics, vol. 23, No. 1, Jan. 2008, pp. 455-463, 9 pages.

Karalis, et al., "Efficient Wirelss Non-Radiative Mid-Range Energy Transfer", ScienceDirect, Annals of Physics 323, 2008, pp. 34-48, 15 pages.

Su, et al., "Mutual Inductance Calculation of Movable Planar Coils on Parallel Surfaces", IEEE Transactions on Power Electronics, vol. 24, No. 4, Apr. 2009, pp. 1115-1124, 10 pages.

Hui, et al., "Coreless Printed Circuit Board (PCB) Transformers—Fundamental Characteristics and Application Potential", IEEE Circuits and Systems, Vo. 11, No. 3, Third Quarter 2000, pp. 1-48, 48 pages.

Sekitani, et al., "A Large-Area Flexible Wireless Power Transmission Sheet Using Printed Plastic MEMS Switches and Organic Field-Effect Transistors", IEEE, Quantum-Phase Electronics Center, School of Engineering, The University of Tokyo, 2006, 4 pages.

Choi, et al., "A New Contactless Battery Charger for Portable Telecommunication/Compuing Electronics", IEEE, School of Electronic and Electrical Engineering, Kyungpook National University, Taegu, Korea, 2011, pp. 58-59 2 pages.

Hui, et al., "Coreless Printed Circuit Board (PCB) Transformers for Power MOSFET/IGBT Gate Drive Circuits", IEEE Transactions on Power Electronics, vol. 14, No. 3, May 1999, pp. 422-430, 9 pages.

Tang, et al., "Coreless Planar Printed-Circuit-Board (PCB) Transformers—A Fundamental Concept for Signal and Energy Transfer", IEEE Transactions on Power Electronics, vol. 15, No. 5, Sep. 2000, pp. 931-941, 11 pages.

Hatanaka, et al., "Power Transmission of a Desk with Cord-Free Power Supply", IEEE Transactions on Magnetics, vol. 38, No. 5, Sep. 2002, pp. 3329-3331, 3 pages.

Fernandez, et al., "Design Issues of a Core-less Transformer for a Contact-less Application", IEEE, Universidad Politecnica de Madrid, 2002, pp. 339-345, 7 pages.

Hui, et al., "A New Generation of Universal Contactless Battery Charging Platform for Portable Consumer Electronic Equipment", IEEE Transactions on Power Electronics, vol. 20, No. 3, May 2005, pp. 620-627, 8 pages.

Liu, et al., "Optimal Design of a Hybrid Winding Structure for Planar Contactless Battery Charging Platform", IEEE, Department of Electronic Engineering, City University of Hong Kong, 2006, pp. 2568-2575, 8 pages.

Topfer, et al., "Multi-Pole Magnetization of NdFeB Sintered Magnets and Thick Films for Magnetic Micro-Actuators", ScienceDirect, Sensor and Actuators, 2004, pp. 257-263, 7 pages.

Topfer, et al., "Multi-Pole Magnetization of NdFeB Magnets for Magnetic Micro-Actuators and Its Characterization with a Magnetic Field Mapping Device", ScienceDirect, Journal of Magnetism and Magnetic Materials, 2004, 124-129, 6 pages.

Sakamoto, et al., "A Novel High Power Converter for Non-Contact Charging with Magnetic Coupling", IEEE Transactions on Magnetics, vol. 30, No. 6, Nov. 1994, pp. 4755-4757, 3 pages.

(56) References Cited

OTHER PUBLICATIONS

Hui, et al., "Some Electromagnetic Aspects of Coreless PCB Transformers", IEEE Transactions on Power Electronics, vol. 15, No. 4, Jul. 2000, pp. 805-810, 6 pages.

Waffenschmidt, et al., "Limitation of Inductive Power Transfer for Consumer Applications", 13th European Conference on Power Electronics and Applications, Barcelona, 2009. EPE '09. pp. 1-10, 10 pages.

Stokes, "Palm Strikes Back with new OS, Pre Handset at CES, http://arstechnica.com/news.ars/post/20090101-palm-laundhes-new-handset-pre-operating", Jan. 8, 2009, 6 pages.

Sullivan, Visteon to Sell Wireless Gadget Charger, "Wire-Free Technology will Lets Consumers Dump Cords and Chargers", Red Herring, Dec. 29, 2006, 2 pages.

Kim, "Wireless Charger for New Palm Phone", San Francisco Chronicle and SFGate.com, May 11, 2009, 2 pages.

Compeau, Red Zen Marketing, "Could This be the Mojo Behind the Palm Pre's Touchstone Charger?", http://redzenmarketing.posterous.com/could-this-be-the-mojo-behind-the-palm-pres-t, Jun. 5, 2009, 3 pages.

Fulton Innovation LLC, "The Big Story for CES 2007: The Public Debut of eCoupled Intelligent Wireless Power", ecoupled, Dec. 27, 2006, 2 pages.

Miller, "Palm May Make Pre Scarce", The San Jose Mercury News, Apr. 29, 2009, 1 page.

Murakami et al., "Consideration on Cordless Power Station Contactless Power Transmission System", IEEE Transactions on Magnets, vol. 32, No. 5, Sep. 1996, 3 pages.

Epson Air Trans "Wireless Power Transfer", http://www.2k1.co.uk/components/epson_airtrans.asp, Dec. 8, 2008, 2 pages.

Choi, et al., "A New Contactless Battery Charger for Portable Telecommunication/Compuing Electronics", IEEE, School of Electronic and Electrical Engineering, Kyungpook National University, Taegu, Korea, 2001, pp. 58-59 2 pages.

PCT International Preliminary Report on Patentability dated Nov. 10, 2011 in re International Application No. PCT/US2010/032845, 7 pages.

WiPower, Wikipedia, the free encyclopedia, http://en.wikipedia.org/wiki/WiPower, Nov. 18, 2011, 2 pages.

PowerbyProxi, Wireless Power Solutions, http://www.powerbyproxi.com/, Nov. 18, 2011, 2 pages.

Now charge your iPhone 4 and 4S with Powermat!, Wireless charging mats and receivers for your iPhone, iPod, Blackberry . . . http://www.powermat.com/, Nov. 18, 2011, 1 page.

Witricity, Wireless Electricity Delivered Over Distance, http://www.witricity.com, Nov. 18, 2011, 1 page.

ConvenientPower, ConvenientPower HK Limited, http://www.convenientpower.com/1/about.php, Nov. 18, 2011, 1 page.

Nigel Power LLC: Private Company Information—Business Week, http://investing.businessweek.com/research/stocks/private/snapshotasp?p . . . , Nov. 18, 2011, 2 pages.

HaloIPT—Wireless Charging is the future for powering electric cars and it . . . , http://www.haloipt.com/, Nov. 18, 2011, 1 page.

Qualcomm Buys HaloIPT for Wireless Charging Technology, Wireless Power Planet, http://www.wirelesspowerplanet.com/news/qualcomm-buys-haloipt-for- . . . , Nov. 18, 2011, 5 pages.

European search report and search opinion in connection with Europe Application 08747863.2 (European National Stage application of PCT/US2008/063084) dated Apr. 2, 2013, 7 pages.

Office Action in connection with Chinese Application 200880023854.4 (Chinese National Stage application of PCT/US2008/063084) dated Aug. 28, 2012, 18 pages.

Office Action in connection with U.S. Appl. No. 12/769,586 dated Aug. 27, 2013, 15 pages.

Office Action in connection with U.S. Appl. No. 13/352,096 dated Sep. 11, 2013, 12 pages.

Office Action in connection with U.S. Appl. No. 13/709,937 dated Sep. 12, 2013, 7 pages.

Office Action in connection with U.S. Appl. No. 12/769,586 dated Dec. 13, 2012, 19 pages.

Office Action in connection with U.S. Appl. No. 13/708,827 dated Jun. 26, 2013, 22 pages.

Office Action in connection with U.S. Appl. No. 13/708,838 dated Jun. 24, 2013, 27 pages.

PCT international Search Report in connection with PCT Application No. PCT/US2011/040062 dated Feb. 17, 2012, 9 pages.

Office Action in connection with U.S. Appl. No. 13/708,548 dated Jun. 7, 2013, 5 pages.

Office Action in connection with U.S. Appl. No. 13/115,811 dated Mar. 28, 2013, 13 pages.

Office Action in connection with U.S. Appl. No. 13/708,520 dated May 24, 2013, 7 pages.

Office Action in connection with U.S. Appl. No. 13/158,134 dated Jun. 12, 2013, 15 pages.

Office Action in connection with U.S. Appl. No. 13/709,983 dated Jun. 17, 2013, 7 pages.

Office Action in connection with U.S. Appl. No. 13/710,017 dated Jun. 11, 2013, 7 pages.

Office Action in connection with U.S. Appl. No. 13/710,062 dated Jun. 7, 2013, 7 pages.

Office Action in connection with Japanese Application JP/2010-507666 (Japanese National Stage application of PCT/US2008/063084) dated Dec. 3, 2012, 4 pages.

Office Actions in connection with U.S. Appl. No. 13/442,698 dated Sep. 13, 2012, 6 pages.

* cited by examiner

POWER SOURCE, CHARGING SYSTEM, AND INDUCTIVE RECEIVER FOR MOBILE DEVICES

CLAIM OF PRIORITY

This application is a continuation of U.S. patent application Ser. No. 11/757,067, titled "POWER SOURCE, CHARGING SYSTEM, AND INDUCTIVE RECEIVER FOR MOBILE DEVICES", filed Jun. 1, 2007, which claims the benefit of priority to U.S. Provisional Patent Application titled "MOBILE DEVICE, CHARGER, AND POWER SUPPLY", Application No. 60/810,262, filed Jun. 1, 2006; U.S. Provisional Patent Application titled "MOBILE DEVICE, BATTERY, CHARGING SYSTEM, AND POWER SUPPLY SYSTEM", Application No. 60/810,298, filed Jun. 1, 2006; and U.S. Provisional Patent Application titled "SYSTEM AND METHOD FOR PROVIDING AND USING A PORTABLE INDUCTIVE POWER SOURCE", Application No. 60/868,674, filed Dec. 5, 2006; each of which applications are hereby incorporated by reference herein.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention is related generally to power supplies, power sources, inductive power sources; charging systems, mobile devices, mobile device chargers, and batteries.

BACKGROUND

There is currently a need for powering portable or mobile devices for use in commercial, business, personal, consumer, and other applications. Examples of such devices include cellular telephones, personal digital assistants (PDAs), notebook computers, mobile email devices, Blackberry devices, Bluetooth headsets, music players (for example, MP3 players), radios, compact disk players, video game consoles, digital cameras, electric shavers, and electric toothbrushes. Most of these devices include a rechargeable internal battery that must be first charged by an external power supply or charger, before the device itself can be used. The power supply typically provides direct current (DC) voltage through a special connector to the device. The power supply can then be disconnected, and the device will continue to run for a short period of time until the battery is depleted. The voltage and power requirements of the different devices vary, and to date there is currently no standardized connector for the devices. As a result of this, each mobile device is invariably sold or distributed bundled with its own charger. The costs associated with these multiple different types and numbers of charger are paid by the consumer indirectly by being incorporated into the prices being charged for the mobile device.

The rapid increase in the total number and variety of mobile products has meant that most people have several of the above-mentioned devices. In a typical day, that user would have to separately connect their multiple devices to each of their appropriate chargers for charging of each device. In addition, many people find it necessary to charge their devices in different locations such as their offices and cars. Thus, many users have purchased additional chargers for their offices and cars, for use in charging their mobile phones, notebook computers, and music players in those locations.

It will be evident that the above situation has caused typical users to have a multitude of incompatible devices (i.e. power supplies and chargers) that essentially provide the same function of charging a mobile device, but because of the number and variety that must be kept by the user are inconvenient to use. In many situations, users simply forget to charge their devices, or else find they need to recharge their device in situations where no appropriate charger is available. This leads to loss of ability to use the device when desired or needed.

In addition, when traveling away from home, mobile users have a particular problem in that they need to pack and carry the multiple chargers for their devices. In many situations, these chargers are bulkier and heavier than the devices themselves, and use of these devices in foreign countries requires clumsy adaptors, and sometimes voltage converters. This leads to a high degree of inconvenience for the ever-more-mobile consumer.

In addition, the power connector for the mobile devices is often cheaply manufactured, and a source of mechanical and electrical failure. In many applications, such as toothbrushes or applications where the device is exposed to water and needs to be hermetically sealed, such a physical connection can not be used. Thus an alternative means of powering those types of devices must be used.

Several products have tried to address this situation. Some companies propose the use of a universal charger that consists of a power supply base unit, and interchangeable tips that both fit into the base unit and in turn fit different devices. The tip includes a customized regulator that sets the voltage required by the particular device. However, a user must carry the multiple tips he or she needs for each of the various devices they have, and then charge each device serially by connecting the device to the power supply. While this product reduces the overall weight of the charging tools the user must carry, the user still needs to carry and exchange the tips to connect to different devices. In addition, the charging of multiple devices simultaneously is often not possible.

Realizing that a power supply typically contains a transformer for voltage conversion, another approach is to split the transformer into two parts: a first part can contain the first winding and the electronics to drive this winding at the appropriate operating frequency, while the second part consists of a winding where power is received and then rectified to obtain DC voltage. If the two parts are brought into physical proximity to each other, power is transformed from the first part to the second inductively, i.e. by induction, without any physical electrical connection. This is the approach that is used in many electrical toothbrushes, shavers, and other products that are expected to be used in wet environments. However, a common problem with such inductive units is that the windings are bulky, which restricts their use in lightweight portable devices. Furthermore, to achieve adequate power transfer, the parts must be designed to fit together suitably so that their windings are closely aligned. This is typically done by molding the device casing (for example, an electric toothbrush) and its charger/holder so that they fit together in only one suitable way. However, the molded base and shape of the portable device means they cannot be used in a universal fashion to power other devices.

Some companies have proposed pad-like charging devices based on inductive concepts, but that also ostensibly allow for different types of devices to be charged. These pads typically includes grids of wires in an x and y direction, that carry an electrical current, and that generate a uniform magnetic field parallel to the surface of the pad. A secondary coil wound around a magnetic core lies on the surface of the pad and picks up the magnetic field parallel to the surface, and in this manner energy can be transferred. However, each of these methods suffer from poor power transfer, in that most of the power in the primary is not picked up in the secondary, and thus the overall power efficiency of the charger is very low. In addition, the magnetic cores used for the primary and secondary are often bulky and add to the total cost and size of the system, and limit incorporation into many devices.

Another point to note is that, while all of the above devices allow a user to charge a device, they also require the charging device or base unit to be electrically connected to a power source, such as a power outlet or a DC source. In many cases, the user may not have access to such a power source such as when traveling, camping, or working in an area without access to power. However, to date, no device has been provided that is portable, and that allows for inductive charging of multiple devices with differing power requirements, and which itself can be intermittently or occasionally charged either by an external power source, or by other means, or that is self-powered or includes its own power source.

SUMMARY

A power source, charging system, and inductive receiver for mobile devices is disclosed herein. In accordance with an embodiment, a pad or similar base unit comprises a primary, which creates a magnetic field by applying an alternating current to a winding, coil, or any type of current carrying wire. A receiver comprises a means for receiving the energy from the alternating magnetic field and transferring it to a mobile or other device. The receiver can also comprise electronic components or logic to set the voltage and current to the appropriate levels required by the mobile device, or to communicate information or data to and from the pad. The system may also incorporate efficiency measures that improve the efficiency of power transfer between the charger and receiver.

In some embodiments the receiver can also comprise electronic components or logic to set the voltage and current to the appropriate levels required by the mobile device, or to communicate information to the pad. In additional embodiments, the system can provide for additional functionality such as communication of data stored in the electronic device or to be transferred to the device. Some embodiments may also incorporate efficiency measures that improve the efficiency of power transfer between the charger and receiver, and ultimately to the mobile device. In accordance with an embodiment the device includes an internal battery for self-powered operation. In accordance with other embodiments the device can include a solar cell power source, hand crank, or other means of power supply for occasional self powered operation. Other embodiments can be incorporated into charging kiosks, automobiles, and other applications.

DETAILED DESCRIPTION

Figure 1:
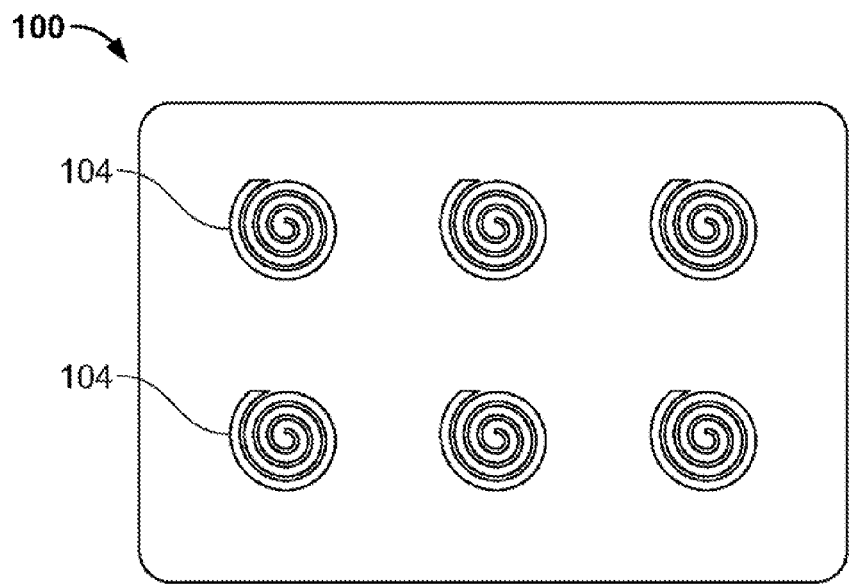
FIG. 1 shows a pad using multiple receiver/energizer coils in accordance with an embodiment of the invention.

A power source, charging system, and inductive receiver for mobile devices is disclosed herein. In accordance with an embodiment, a pad or similar base unit comprises a primary, which creates a magnetic field by applying an alternating current to a winding, coil, or any type of current carrying wire. A receiver comprises a means for receiving the energy from the alternating magnetic field and transferring it to a mobile or other device. The receiver can also comprise electronic components or logic to set the voltage and current to the appropriate levels required by the mobile device, or to communicate information or data to and from the pad. The system may also incorporate efficiency measures that improve the efficiency of power transfer between the charger and receiver.

In some embodiments the receiver can also comprise electronic components or logic to set the voltage and current to the appropriate levels required by the mobile device. In some embodiments, the receiver can also contain circuitry to sense and determine the status of the electronic device to be charged, the battery inside, or a variety of other parameters and to communicate this information to the pad. In additional embodiments, the system can provide for additional functionality such as communication of data stored in the electronic device (for example, digital images stored in cameras, telephone numbers in cell phones, songs in MP3 players) or data into the device.

Embodiments can also incorporate efficiency measures that improve the efficiency of power transfer between the charger and receiver, and ultimately to the mobile device. In accordance with an embodiment, the charger or power supply comprises a switch, (for example, a MOSFET device or another switching mechanism), that is switched at an appropriate frequency to generate an alternative current (AC) voltage across a primary coil, and generates an AC magnetic field. This field in turn generates a voltage in the coil in the receiver that is rectified and then smoothed by a capacitor to provide power to a load, with the result being greater efficiency.

In accordance with other embodiments the coils are mounted such that they can move laterally within the pad and within an area of their segments, while continuing to be connected to their driver electronics placed on the edges of the area. The floating coils and the drive circuit are sandwiched in between thin upper and lower cover layers that act to allow the coils lateral movement while limiting vertical movement. When a secondary is placed on the pad, the pad senses the position of the secondary coil and moves the coils to the right position to optimize power transfer. Magnets can be used to better orient the coils and improve greater power transfer efficiency.

Additional embodiments are also described herein. For example, in accordance with an embodiment the device includes an internal battery for self-powered operation. In accordance with other embodiments the device can include a solar cell power source, hand crank, or other means of power supply for occasional self powered operation. Other embodiments can be incorporated into charging kiosks, automobiles, computer cases, and other electronic devices and applications.

Inductive Charging System

While the above mentioned technologies describe various aspects of inductive charging, they do not address the basic requirements that a consumer and manufacturer desire in such a product. These include the following desired features:

The pad should be able to charge a number of devices with various power requirements efficiently. A typical number would be 1-6 devices, and probably up to 4 low power (up to 5 W) devices simultaneously. When multiple devices are being charged, a method for energizing only those coils near a device is preferable.

The same pad should be able to power low-power devices (mobile phones, PDAs, cameras, game consoles, etc.) with power requirements of 5 W or less, and higher-power devices such as notebook computers (which often have a power requirement of 60 W or higher).

The power transfer efficiency between the primary coil and the secondary should be maximized. Lack of efficiency in the power transfer would necessitate larger and heavier AC to DC power supplies. This would add cost and decrease product attractiveness to customers. Thus methods where the entire pad is energized are not as attractive.

A simple method for verification of the manufacturer of the secondary, and possibly information for power requirements, should be supported as necessary to ensure product compatibility and to provide means of product registration and licensing.

The EMI radiation from the system should be minimized, and ideally, the system should radiate little or no EMI with no device present. A charger should preferably not emit any power until an appropriate device is brought close to the charger itself. In this way, electric power is not wasted, and electromagnetic power is not emitted needlessly. In addition, accidental effects on magnetically sensitive devices such as credit cards, disk drives and such are minimized.

The pad and the receiver should be reasonably simple to construct, and cost effective. Since both parts can be integrated into mobile devices, the overall size, weight, and form factor should be minimized.

As used herein, the term "charger" can refer to a device for supplying power to a mobile or stationary device for the purpose of either charging its battery, operating the device at that moment in time, or both. For example, as is common in portable computers, the power supply can operate the portable computer, or charge its battery, or accomplish both tasks simultaneously. In accordance with an embodiment, the mobile device charger can have any suitable configuration, such as the configuration of a flat pad. The power received by the mobile device from the mobile device charger (such as the primary in the mobile device charger) can be rectified in the receiver and smoothed by a capacitor before being connected to the rechargeable battery which is represented by the load in the picture above. To ensure proper charging of the battery, a regulator can be placed between the output of the receiver and the battery. This regulator can sense the appropriate parameters of the battery (voltage, current, capacity), and regulate the current drawn from the receiver appropriately. The battery can contain a chip with information regarding its characteristics that can be read out by the regulator. Alternatively, such information can be stored in the regulator for the mobile device to be charged, and an appropriate charging profile can also be programmed into the regulator.

FIG. 1 shows a pad using multiple receiver/energizer coils in accordance with an embodiment. In its simplest format, the mobile device charger or power supply preferably has a substantially flat configuration, such as the configuration of a pad 100, and comprises multiple coils or sets of wires 104. These coils or wires can be the same size as or larger than the coils or wires in the mobile devices, and can have similar or different shapes, including for example a spiral shape. For example, for a mobile device charger designed to charge up to four mobile devices of similar power (up to 10 W each) such as mobile handsets, MP3 players, etc., four or more of the coils or wires would ideally be present in the mobile device charger. The charger pad or pad can be powered by plugging into a power source such as a wall socket. The pad can also be powered by another electronic device, such as the pad being powered through the USB outlet of a laptop or by the connector that laptops have at the bottom for interfacing with docking stations, or powering other devices. The pad can also be incorporated into a docking station, such as may be used by notebook computers.

A mobile device can include a receiver that includes one or more coils or wires to receive the power from the mobile device charger. As described in further detail below, the receiver can be made part of the battery in the mobile device or of the shell of the mobile device. When it is part of the mobile device shell, the receiver can be part of the inside surface of the mobile device shell or of the outside surface of the mobile device shell. The receiver can be connected to the power input jack of the mobile device or can bypass the input jack and be directly connected to the battery. In any of these configurations, the receiver includes one or more appropriate coil or wire geometries that can receive power from the mobile device charger when it is placed adjacent to the mobile device charger. In accordance with an embodiment, the coils in the mobile device charger and/or the coils in the mobile devices can be printed circuit board (PCB) coils, and the PCB coils can be placed in one or more layers of PCB.

In some embodiments, the charger can also itself be built into a mobile device. For example, a laptop computer or other portable or mobile device can incorporate a charger section so that other mobile devices can be charged as described above. Alternatively, using the same set of coils or wires, or a separate set of coils or wires, any mobile device can itself be used as a charger to power or charge other mobile devices.

In accordance with an embodiment, the mobile device charger or pad, and the various mobile devices, can communicate with each other to transfer data. In one embodiment, the coils in the mobile device charger that are used for powering the mobile device, or another set of coils in the same PCB layer or in a separate layer, can be used for data transfer between the mobile device charger and the mobile device to be charged or the battery directly. Techniques employed in radio and network communication, such as radio frequency identification (RFID) can be used. In one embodiment a chip connected to an antenna (for example, the secondary coil or separate data antenna) or another means of transfer of information can be used to provide information about, for example, the presence of the mobile device, its authenticity (for example its manufacturer code) and the device's charging requirements (such as its required voltage, battery capacity, and charge algorithm profile).

In accordance with an embodiment, a typical sequence for charger operation can be as follows: The mobile device charger can be in a low power status normally, thus minimizing power usage. However, periodically, each of the coils (or a separate data coil in another PCB layer) is powered up in rotation with a short signal such as a short radiofrequency (RF) signal that can activate a signal receiver in the secondary such as an RF ID tag. The mobile device charger then tries to identify a return signal from any mobile device (or any secondary) that may be nearby. Once a mobile device (or a secondary) is detected, the mobile device charger and the mobile device proceed to exchange information. This information can include a unique ID code that can verify the authenticity and manufacturer of the charger and mobile device, the voltage requirements of the battery or the mobile device, and the capacity of the battery. For security purposes or to avoid counterfeit device or pad manufacture, such information could be encrypted, as is common in some RFID tags.

In accordance with various embodiment, other protocols such as Near Field Communications (NFC) or Felica can be used, wherein the circuitry containing the ID and the necessary information is powered either by the mobile device or remotely by the mobile device charger. Depending on the particular implementation needs, Bluetooth, WiFi, and other information transfer processes can be used. Additional information regarding the charging profile for the battery can also be exchanged and can include parameters that would be used in a pre-programmed charge profile stored in the mobile device charger. However, the information exchanged could be as simple as an acknowledge signal that shows the mobile device charger that a mobile device is present. The charger can also contain means for detection and comparison of the strength of the signal over different locations on the charger. In this way, it could determine the location of the mobile device on the charger, and then proceed to activate the appropriate region for charging.

In some embodiments that require greater simplicity, no communication need take place between the mobile device charger and the mobile device. In some embodiments the mobile device charger can sense the mobile device by detecting a change in the conditions of a resonant circuit in the mobile device charger when the mobile device is brought nearby. In other embodiments the mobile device can be sensed by a number of proximity sensors such as capacitance, weight, magnetic, optical, or other sensors that determine the presence of a mobile device near a coil in the mobile device charger. Once a mobile device is sensed near a primary coil or section of the mobile device charger, the mobile device charger can then activate that primary coil or section to provide power to the secondary coil in the mobile device's battery, shell, receiver module, or the device itself.

Inductive Charging Circuit

Each mobile device and its battery has particular characteristics (voltage, capacity, etc.). In order to facilitate these different devices with a single universal mobile device charger, several circuit architectures are possible, some of which are described in further detail below.

Figure 2:
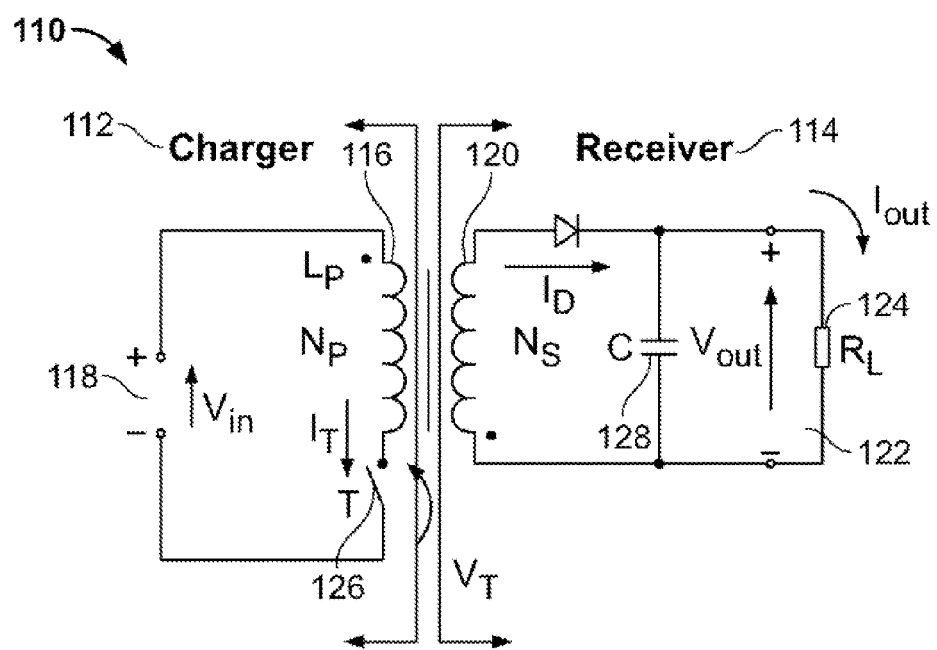
FIG. 2 shows a figure of a circuit diagram in accordance with an embodiment of the invention.

FIG. 2 shows the main components of a typical inductive power transfer system 110. The circuit illustrated is used to illustrate the principle of inductive power transfer and is not meant to be limiting to the present invention. In accordance with an embodiment, the charger 112 comprises a power source 118, and a switch T 126 (which can be a MOSFET or other switching mechanism) that is switched at an appropriate frequency to generate an AC voltage across the primary coil Lp 116 and generate an AC magnetic field. This field in turn generates a voltage in the coil 120 in the receiver 114 that is rectified and then smoothed by a capacitor to provide power 122 to a load RI 124. For ease of use, a receiver can be integrated with a mobile device, such as integrated inside the mobile device or attached to the surface of the mobile device during manufacture, to enable the device to receive power inductively from a mobile device charger or integrated into, or on its battery.

The mobile device or its battery typically can include additional rectifier(s) and capacitor(s) to change the AC induced voltage to a DC voltage. This is then fed to a regulator chip which includes the appropriate information for the battery and/or the mobile device. The mobile device charger provides power and the regulation is provided by the mobile device. The mobile device charger, after exchanging information with the mobile device, determines the appropriate charging/powering conditions to the mobile device. It then proceeds to power the mobile device with the appropriate parameters required. For example, to set the mobile device voltage to the right value required, the value of the voltage to the mobile device charger can be set. Alternatively, the duty cycle of the charger switching circuit or its frequency can be changed to modify the voltage in the mobile device. Alternatively, a combination of the above two approaches can be followed, wherein regulation is partially provided by the charger, and partially by the circuitry in the secondary.

Inductive Charger

Figure 3:
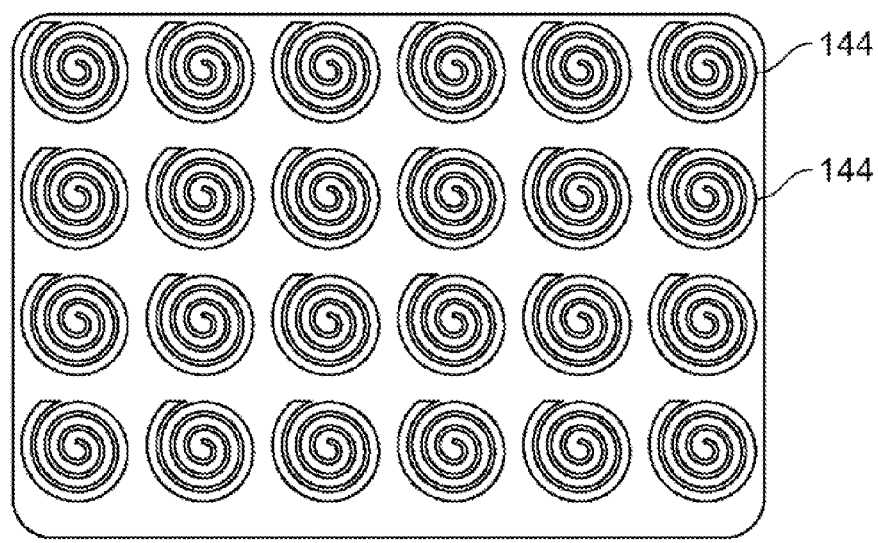
FIG. 3 shows a charging pad using multiple coils in accordance with an embodiment of the invention.

To allow the operation of the mobile device charger regardless of position of the mobile device, the total area of the mobile device charger can be covered by coils or by another wire geometry that creates magnetic field. FIG. 3 shows a charging pad using multiple coils in accordance with an embodiment of the invention. As shown in FIG. 3, the pad 140 is largely covered with individual energizer coils 144.

Figure 4:
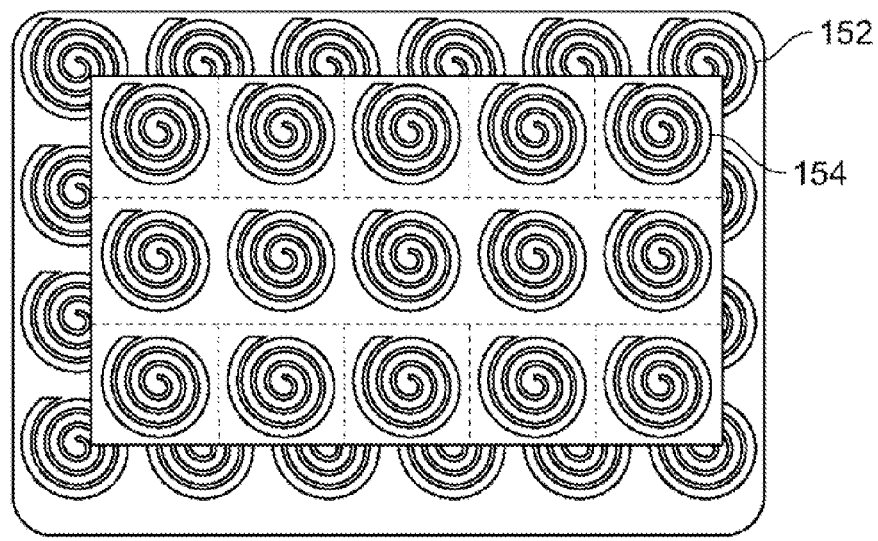
FIG. 4 shows a charging pad using multiple overlapping coil layers in accordance with an embodiment of the invention.

FIG. 4 shows a charging pad using multiple overlapping coil layers in accordance with an embodiment of the invention. This embodiment addresses the problem of voids between the multiple coils. As shown in FIG. 4, any areas of the pad 150 with minimal magnetic field between a first set of coils 152 can be filled by a second set of coils 154, that are tiled such that the centers of this coil array fill the voids in the primary set. This second set can be at a different layer of the same PCB, or in a different PCB. In each of these geometries, the sensing circuitry can probe each location of a coil in a raster, predetermined, or random fashion. Once a mobile device on or near a coil is detected, that coil is activated to provide power to the receiving unit (secondary) of the appropriate device.

It can be seen from the above example that by providing more layers of the PCB with coils, or by providing coils of different geometry or size, one can obtain as much resolution or coverage as desired.

In accordance with an embodiment, to power mobile devices with power requirements that exceed maximum powers attainable by typical coils in a surface, the mobile device, during its hand shake and verification process can indicate its power/voltage requirements to the mobile device charger. Several geometries for achieving power/voltage levels otherwise not attainable from a single primary coil of the mobile device charger are possible.

In one geometry, the power receiving unit of the mobile device has several coils or receiving units that are connected such that the power from several primary coils or sets of wires of the mobile device charger can add to produce a higher total power. For example, if each primary coil is capable of outputting a maximum of 10 Watts, by using 6 primary coils and 6 secondary coils, a total output power of 60 Watts can be achieved. The number of primary and secondary coils need not be the same, and a large secondary coil (receiving unit) that would be able to capture the majority of magnetic flux produced by 6 or other number of primary coils or a large primary coil powering 6 or some other number of secondary coils can achieve the same effect. The size and shape of the multiple primary coils and secondary coils also do not need to be the same. Furthermore, neither set of primary and secondary coils need to be in the same plane or PCB layer. For example, the primary coils in the examples shown above could be dispersed such that some lay on one PCB plane and the others in another plane.

In another geometry, the PCB of the mobile device charger has multiple layers, wherein coils or wire patterns of certain size and power range can be printed on one or more layers and other layers can contain coils or wire patterns of larger or smaller size and power capability. In this way, for example, for low power devices, a primary from one of the layers will provide power to the mobile device. If a device with higher power requirements is placed on the mobile device charger, the mobile device charger can detect its power requirements and activate a larger coil or wire pattern with higher power capabilities or a coil or wire pattern that is connected to higher power circuitry.

One may also achieve similar results by using a combination of the different processes and geometries described above.

Figure 5:
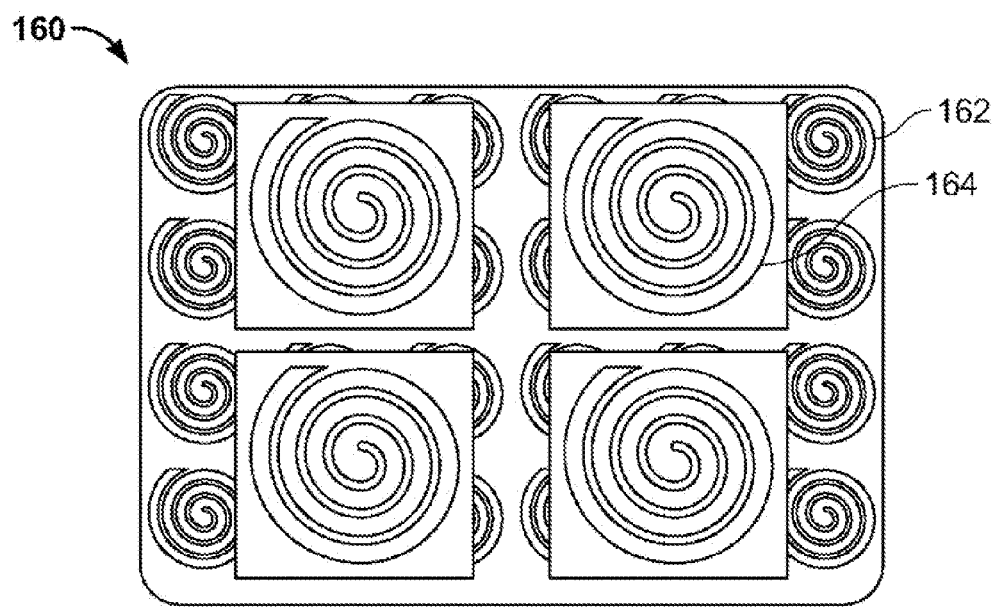
FIG. 5 shows the use of multiple coil types and sizes in overlapping pad layers in accordance with an embodiment of the invention.

FIG. 5 shows the use of multiple coil types and sizes in overlapping pad layers in accordance with an embodiment of the invention. As shown in FIG. 5, the mobile device charger or pad 160 can comprise two overlapping layers with a first layer 162 containing low power coils, and a second layer 164 containing high power coils.

Inductive Charging Receiver

To apply the inductive charging technology to current and future electronic devices, some of the desired characteristics include:

The receiver should provide sufficient power to the mobile or other device with the device in proximity (e.g. several millimeters to several centimeters) to the pad or charging device.

The receiver should be of low cost, and of reasonably small size in terms of volume and weight.

The receiver may in some instances be capable of being integrated into the inside of the device by the device manufacturer, so as to allow customers to then use the mobile device with a charging pad.

The receiver may in some instances contain circuitry to identify the presence of the receiver and the characteristics of the charging pad.

The receiver may in some instances contain a means of communication of information and data from the mobile device to the pad.

As described above, the inductive charging pad is used to power a receiver, which in turn is used to power or to charge a portable or mobile device. In accordance with one embodiment of the receiver, the power from the mobile device charger is emitted at a magnitude that would be sufficient to power any foreseeable mobile device (such as 5 or 10 W for small mobile devices). The receiver that is appropriate for each mobile device has a power receiving part that when matched to the mobile device charger is able to receive sufficient power for the mobile device. For example a receiver for a mobile phone requiring 2.5 Watts can be a coil with certain diameter, number of turns, wire width, etc. to allow receipt of the appropriate power. The power is rectified, filtered, and then fed into the battery or power jack of the device. As discussed above, a regulator can be used before the power is provided to the battery or the mobile device.

To save energy, the power emitted by the mobile device charger can be regulated. It is desirable to regulate the power emitted by the charger because if the charger is emitting 10 W of power and the receiver is designed to receive 5 W, the rest of the emitted power is wasted. In one embodiment, the receiver or the mobile device can, through an electrical (such as RF), mechanical, or optical method, inform the charger about the voltage/current characteristics of the device. The primary of the charger in the circuit diagrams shown above then can be driven to create the appropriate voltage/current in the receiver. For example, the duty cycle of the switch in that circuit can be programmed with a microprocessor to be changed to provide the appropriate levels in the receiver.

In accordance with an embodiment, this can be done by a look up table in a memory location connected to a microprocessor or by using an algorithm pre-programmed into the microprocessor. Alternatively, the frequency of the switch can be changed to move the circuit into, and out of, resonance to create the appropriate voltage in the receiver. In an alternate geometry, the voltage into the circuitry in the primary can be changed to vary the voltage output from the receiver. Furthermore, the induced voltage/current in the mobile device can be sensed and communicated to the charger to form a closed-loop, and the duty cycle, frequency, and/or voltage of the switch can be adjusted to achieve the desired voltage/current in the mobile device.

In accordance with an embodiment, the receiver is built onto or into the battery for the mobile device. The receiver can include one or more coils or wires shaped to receive power from the charger. The one or more coils or wires can be either printed on one or more PCBs, or formed from regular wires. As described above, the receiver can also contain rectifier(s) and capacitor(s) to produce a cleaner DC voltage. This output can be directly, or through a current limiting resistor, connected to one of the contacts on the battery. To avoid over-charging the battery, a battery regulator chip can also be used. This circuit then measures the various parameters of the battery (voltage, degree of charging, temperature, etc.) and uses an internal program to regulate the power drawn from the circuit to ensure over-charging does not occur. The circuit could also include LEDs to show the receiver being in the presence of a magnetic field from the charger, complete charge LEDs and/or audible signals.

In typical commercial and end-user applications such as cell phones, PDAs, and MP3 players, the battery could be incorporated into the battery pack or device by the original equipment manufacturer (OEM), or as an after market size and shape compatible battery pack that can replace the original battery pack. The battery compartment in these applications is typically at the bottom of the device. The user can open the battery compartment, take out the conventional battery, replace it with a modified battery in accordance with an embodiment of the invention, and then replace the battery lid. The battery could then be charged inductively when the mobile device is placed adjacent a mobile device charger.

Figure 6:
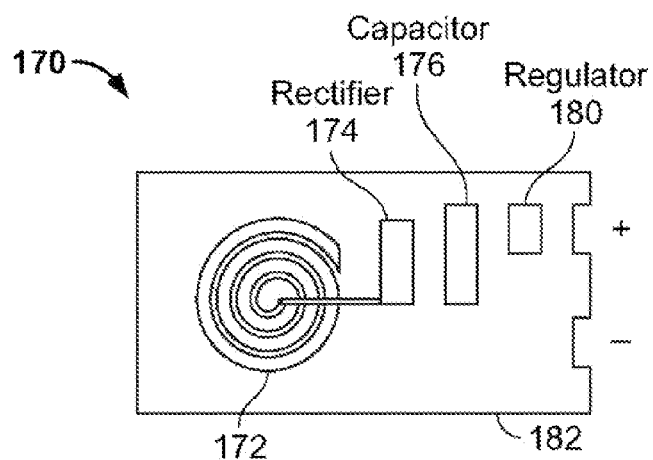
FIG. 6 shows a receiver with an integrated battery in accordance with an embodiment of the invention.

To enhance the ability of the receiver to receive power, it may be desirable to minimize the distance between the charger's primary coil and the receiver's coil or wire. In order to achieve this, in accordance with an embodiment the receiver's coil or wire can be put on the outside of the battery pack. FIG. 6 shows a receiver with an integrated battery in accordance with an embodiment of the invention. As shown in FIG. 6, the receiver 170 comprises the battery 182, together with the secondary coil 172, and any rectifiers 174, capacitors 176, regulators 180 necessary for proper operation of the charging receiver. If the battery compartment lid of the device prevents a power receiving light emitting diode (LED) to be seen, the lid can itself be replaced with a see-through lid or a lid with a light pipe that will allow the user to see the charging indicator LED when the mobile device is placed adjacent to the charger.

In an alternative embodiment, the receiver battery can include a mechanical, magnetic, or optical method of alignment of the coils or wires of the charger and mobile device for optimum power transfer. In accordance with an embodiment, the center of the primary in the charger contains a magnet such as a cylinder or disk with the poles parallel to the charger surface and the magnetic field perpendicular to the charger surface. The receiver also contains a magnet or magnetic metal part of a similar shape behind or in front of the center of the coil or wire receivers. When the mobile device is placed on or adjacent to the charger, the magnets attract and pull the two parts into alignment with the centers of the two coils or wires aligned. The magnets do not need to be especially strong to actively do this. Weaker magnets can provide guidance to the user's hand and largely achieve the intended results. Alternatively, audible, or visual signs (LEDs that get brighter with the parts aligned), or mechanical means (dimples, protrusions, etc.) can be used for alignment.

In another embodiment, the coil or wires and the magnet in the charger are mechanically attached to the body of the charger such that the coil can move to align itself appropriately with the mobile device when it is brought into close proximity to the charger. In this way, an automatic alignment of coils or wire patterns can be achieved.

In another embodiment, the receiver electronics described above are preferably made from flexible PCB which can be formed into a curved shape. Such a PCB can be placed on the surface of a battery pack that is not flat or that has a curved shape. The curve on the battery or back of a mobile device battery lid can be matched to a curved primary in the mobile device charger and be used for alignment. One example of usage of this embodiment can be for example flashlights that have circular handles: the batteries can be charged with coils on the side of circular batteries, or circling the cylindrical battery. Similarly, the mobile device charger can have a curved shape. For example, the charger surface can be in the shape of a bowl or some similar object. A mobile device that may have a flat or curved back can be placed into the bowl. The shape of the bowl can be made to ensure that the coil of the mobile device is aligned with a primary coil to receive power.

In another embodiment, the primary can be incorporated into a shape such as a cup. A mobile device can be placed into the cup standing on end and the receiver could be built-in to the end of the mobile device (such as a mobile phone) or on the back or circumference of the device. The receiver can receive power from the bottom or wall of the cup.

In another embodiment, the primary of the charger can have a flat shape and the mobile devices can be stood up to receive power. The receiver is built into the end of the device in this case and a stand or some mechanical means can be incorporated to hold the device while being charged.

In another embodiment, the charger can be made to be mounted on a wall or a similar surface, vertically or at an angle (such as on a surface in a car), so as to save space. The charger could incorporate physical features, magnets, fasteners or the like to enable attachment or holding of mobile devices to be charged. The devices to be charged can also incorporate a retainer, magnet, or physical shape to enable them to stay on the charger in a vertical, slanted, or some other position. In this way, the device could be charged by the primary while it is near or on it.

For those applications where the lid of the battery compartment or the bottom part of the mobile device is made from a metal, a replacement non-metallic lid or backing can be used. Alternatively, the coil can be attached to the outside of the metal surface. This allows electromagnetic (EM) fields to arrive at the power receiver coil or wires. The rest of the receiver (i.e. circuitry) can be placed behind a metal for the receiver to work. In some other applications where the battery has metal parts, these parts may interfere with the EM field and the operation of the coil in the receiver. In these cases, it may be desirable to provide a distance between the metal in the battery and the coils. This could be done with a thicker PCB or battery top surface. Alternatively, to provide additional immunity, ferrite material (such as those provided by Ferrishield Inc.) can be used between the receiver and the battery to shield the battery from the EM fields. These materials can be made so as to be thin, and then used during the construction of the integrated battery/receiver.

In another embodiment, the receiver in the battery also includes a means for providing information regarding battery manufacturer, required voltage, capacity; current, charge status, serial number, temperature, etc. to the charger. In a simplified embodiment, only the manufacturer, required voltage, and/or serial number is transmitted. This information is used by the charger to adjust the primary to provide the correct charge conditions. The regulator in the receiver can then regulate the current and the load to charge the battery correctly and can end charge at the end. In another embodiment, the receiver can control the charging process fully depending on the time dependent information on battery status provided to it. Alternatively, the charging process can be controlled by the charger in a similar manner. As described above, the information exchange between the charger and the receiver can be through an RF link or an optical transmitter/detector, RFID techniques, Near-Field Communication (NFC), Felica, Bluetooth, WiFi, or some other method of information transfer. Similarly, the receiver could send signals that can be used by the charger to determine the location of the receiver to determine which coil or section of the charger to activate. The communication link can also use the same coil or wires as antenna for data transfer or use a separate antenna. In some embodiments the received can use the actual capabilities of the mobile device (for example, the built-in Bluetooth or NFC capabilities of mobile phones) to communicated with the charging pad.

Figure 7:
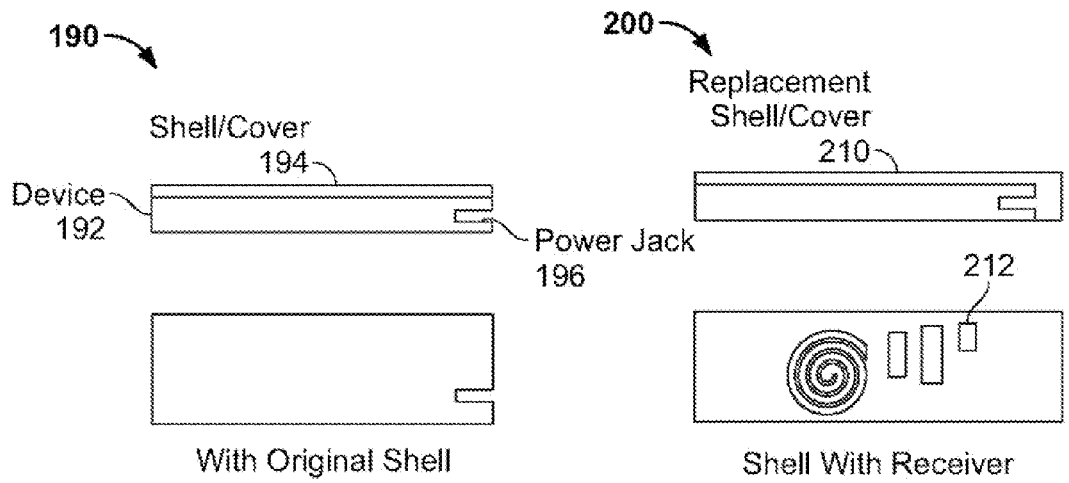
FIG. 7 shows a coupling of receiver with a device to be charged in accordance with an embodiment of the invention.

As described above, in accordance with some embodiments the receiver can be integrated into the body of the device itself at a location that may be appropriate and can be exposed to EM radiation from outside. The output of the receiver can be routed to the electrodes of the battery internally inside the device and appropriate circuitry inside the device can sense and regulate the power. The device can include LEDs, messages, etc. or audible signs that indicate to the user that charging is occurring or complete or indicate the strength of the received power (i.e. alignment with a primary in the charger) or the degree of battery charge. In other embodiments, the receiver is built into an inner or outer surface of a component that is a part of the mobile device's outer surface where it would be closest to the charger. This can be done as original equipment or as an after-market item. The component can be the lid of the battery pack or the bottom cover of the mobile device. In yet other embodiments, the receiver can be integrated into the back or front of the battery compartment or an interchangeable shell for the mobile device for use in after-market applications. For example, in a mobile phone application, the back battery cover or shell can be removed and replaced with the new shell or battery cover with the receiver built in. FIG. 7 shows a coupling of receiver with a device to be charged in accordance with an embodiment of the invention. As shown in FIG. 7, the original mobile phone setup 190 includes a device 192 with shell 194 and power jack 196. The after-market modification 200 replaces the original shell with a combination shell 210 that includes the necessary receiver coils and battery couplings. The contacts from this circuitry can then make direct contact to the battery electrodes inside the mobile device or to some contact points inside the mobile device if such contacts exist or become provisioned by the device manufacturer during manufacture. Alternatively, the receiver may be a component (such as a shell) that has a connector that plugs into the input power jack of the mobile phone. The receiver can be fixed to, or detachable from, the mobile device. This could be achieved by having a plug that is attached either rigidly or by a wire to the receiver (shell). Alternatively, the replacement receiver (shell) could be larger than the original shell and extend back further than the original shell and contain the plug so that when the receiver (shell) is attached, simultaneously, contact to the input power jack is made. Alternatively, the receiver (shell) can have a pass-through plug so that while contact is made to this input power connector, the connector allows for an external regular power supply plug to be also used as an alternative. Alternatively, instead of a pass-through, this part could have a power jack in another location in the back so that a regular power supply could be used to charge the battery. In cases where the connector to the device performs other functions such as communication to the device, a pass-through connector can allow communication/connectivity to the device.

In accordance with another embodiment, the replacement receiver (i.e. the replacement shell) or the plug in unit, in addition to the power receiver components and circuitry, can include additional circuitry that can provide further functionalities to the mobile device. These could include, for example, the ability to exchange data through Bluetooth, WiFi, NFC, Felica, WiMax, RFID, or another wireless or optical mechanism. It could also provide extended functionalities such as Global Positioning System (GPS) location information, flashing lights, flashlight, or other decorative or electronic functions. As described above, various methods for improving coil alignment, or location, battery manufacturer, or battery condition information transfer can also be integrated into the receiver or replacement shell.

In another embodiment, the receiver is supplied in the form of a separate unit that is attached to the input jack of the mobile device or integrated into a secondary protective skin for the mobile device. Many leather or plastic covers for mobile phones, cameras, and MP3 players already exist. The primary purpose of these covers is to protect the device from mechanical scratches, shocks, and impact during daily use. However, they often have decorative or advertising applications. In accordance with one embodiment, the receiver is formed of a thin PCB with the electronics formed thereon, and the receiver coil or wire that is attached to the back of the device and plugs into the input jack similar to the shell described above. Alternatively, it can be connected through a flexible wire or flexible circuit board that is routed to a plug for the input power jack.

In another embodiment, the receiver can be a separate part that gets plugged into the input jack during charging and is placed on the charger and can then be unplugged after charging is finished.

In yet another embodiment, the receiver is built in the inside or outside surface or in between two layers of a plastic, leather, silicone, or cloth cover for the mobile device and plugs in or makes contact to the contact points on the device.

It will be noted that certain devices such as notebooks and some music players have metal bottom surfaces. The methods described above for changing the back surface or use of a plug in the mobile device or a secondary skin with an integrated receiver is particularly useful for these applications. As described previously, the effect of the metal surface can also be minimized, if necessary, by increasing the distance between the wires of the receiver and the metal surface or by placing a Ferrite layer in between the receiver and the metal bottom.

It is also noted that the use of methods such as curving the receiver or integrating magnets, LEDs, audio signals or messages, etc. for alignment, or methods for location, manufacturer or charging condition identification, as described above are possible with all embodiments of the present invention described above. In any of the above cases, the charger can contain lights, LEDs, displays, or audio signals or messages to help guide the user to place the mobile device on a primary coil for maximum reception, to show charging is occurring, and to show the device is fully charged. Displays to show how full the battery is or other information can also be incorporated.

Portable Inductive Charging Pad

In accordance with an embodiment a flexible mobile device charger is provided in the shape of a pad that can be folded or rolled up for carrying. In one implementation of the invention, the electronics of the charger are placed on a thin flexible PCB or the coils are made of wires that can be rolled up or shaped. The electronics components made of silicon chips, capacitors, resistors and the like may not be flexible but take up very little space. These rigid components can be mounted on a flexible or rigid circuit board, while the main section of the pad containing the coils or wires for energy transfer could be made to be flexible to allow conformity to a surface or to be rolled up. Thus the pad resembles a thin mouse pad or the like.

In some cases, it may be advantageous to the user to have a mobile device charger that is extendible in functionalities. The cases include but are not limited to:

- A user may purchase a mobile device charger for charging a single low power device but, at a later stage, may want to extend the capability to charge more devices simultaneously.
- A user may purchase a mobile device charger for charging one or more low power devices but may want to charge more low power or high power devices.
- A user may buy a mobile device charger that can charge one or more low-power or high-power devices and later wish to have the communication or local storage, or a rechargeable battery, or means of power generation such as solar panels or some other capability, added to the charger.

Figure 8:
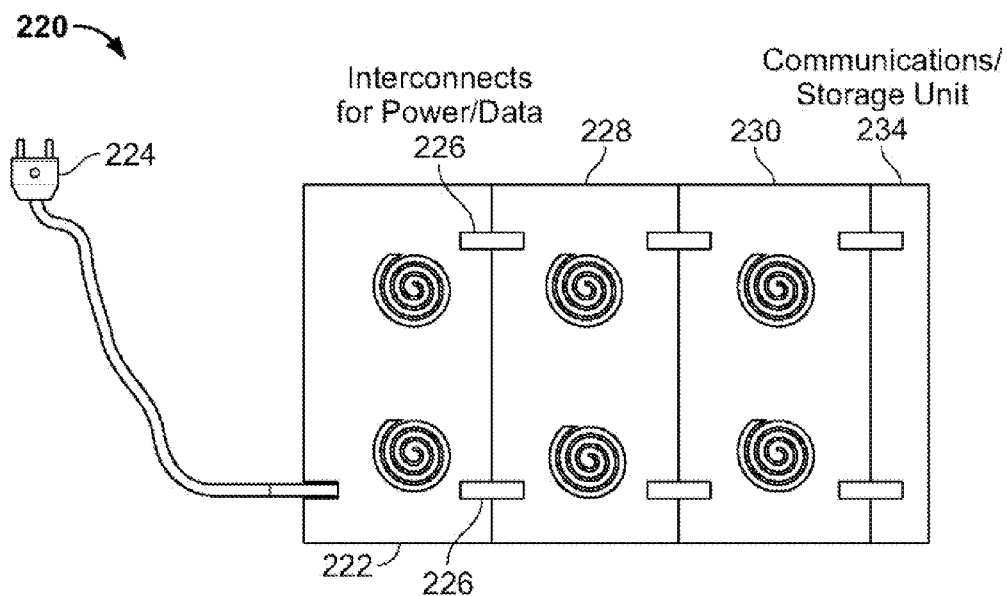
FIG. 8 shows a pad allowing modular or multiple connectivity in accordance with an embodiment of the invention.

In all of the cases above and others, it can be useful to have a modular approach to expand the capabilities of the mobile device charger. FIG. 8 shows a pad 220 allowing modular or multiple connectivity in accordance with an embodiment of the invention. In this case, the user can purchase a first unit 222 that is powered by an electric outlet 224. However, interconnects 226 for power and data are provided so that additional units 228, 230 can simply fit or plug into this first one directly or indirectly and expand the capabilities as the customer's needs grow. Data communications and storage units 234 can also be attached in a modular fashion. This approach would enable the customer to use the technology at a low cost entry point and grow his/her capabilities over time.

Some of the electronics devices that can benefit from these methods include: mobile phones, cordless phones, personal data assistants (PDAs), pagers, mobile electronic mail devices, Blackberry's, MP3 players, CD players, DVD players, game consoles, headsets, Bluetooth headsets, head-mounted displays, GPS units, flashlights, watches, cassette players, laptops, electronic address books, handheld scanning devices, toys, electronic books, still cameras, video cameras, film cameras, portable printers, portable projection systems, IR viewers, underwater cameras or any waterproof device, toothbrushes, shavers, medical equipment, scientific equipment, dental equipment, military equipment, coffee mugs, kitchen appliances, cooking pots and pans, lamps or any battery, DC, or AC operated device.

In addition, inductive power transfer can provide power to devices that are not so far battery operated. For example, a mobile device charger in the shape of a pad placed on a desk or a kitchen table can be used to power lamps or kitchen appliances. In one embodiment for the use in a kitchen, a flat charger, such as a pad, placed on or built into a counter can allow the chef to place devices on the charger to be inductively charged during use and simply place them away after use. The devices can be, for example, a blender, mixer, can opener, or even pot, pan, or heater. This can eliminate the need for a separate cooking and work area. It will be noted that placement of a metal pan close to the inductive pad could directly heat the pan and the contents while keeping the charger surface cool. Due to this reason, inductive kitchen ranges have been commercialized and shown to be more efficient than the electric ranges that work by resistive heating of a coil.

In another embodiment, rather than direct heating of metal pans by nearby inductive fields, cooking pans may include a receiver and heating or even cooling elements. Once placed on a charger, the pan would heat up or cool down as desired by a dial or the like on the pan allowing precise temperature control of the pan and the contents.

Similarly, in an office or work area setting, if a charger is readily available for charging mobile devices, it can also be used to power up lamps for illumination of the desk or used to power or charge office appliances, such as fax machines, staplers, copiers, scanners, telephones, and computers. In one embodiment, the receiver can be built into the bottom of a table lamp and the received power would be used to power the incandescent or LED lamp.

In another embodiment, a mug, cup, glass, or other eating appliance such as a plate can be fitted with a receiver at its bottom. The received power can be used to heat the mug, etc. with a heating coil thus keeping beverages or food warm to any degree desired. Furthermore, in accordance with an embodiment, by use of devices such as thermoelectric coolers the contents could be cooled or heated as desired.

Similarly, many children's toys often run out of battery due to extended use or simple forgetfulness to turn the device off. Often these batteries are included inside a battery compartment that for safety reasons can only be opened by a screwdriver. Inclusion of the receiver into toys could reduce the need to change the device batteries and allow recharging with a much simpler method.

In another implementation, the receiver can be built into medical devices that are implanted or inserted in the body. Since batteries in these devices such as pace makers, cochlear implants, or other monitoring devices may need periodic charging, inductive power transfer can provide an ideal non-contact method for charging and testing the performance of the devices (i.e. check up) or downloading data that the devices have logged.

In another implementation, some active RFID tags include batteries that can send out information about the status or location of a package or shipment. An inexpensive method for charging these tags would be to include a receiver with each tag. Thus, a charger can be used to power or charge these RFID tags.

It will be noted that the effective working distance of the inductive charger is dependent on the power and the frequency of the source. By increasing the frequency to several or tens of MHz, one can obtain a working distance of several inches or feet depending on the application for the technology. It will also be noted that any of the above embodiments that eliminate the input power jack are especially important because they add to product reliability by removing a source of mechanical or environmental failure. In addition, elimination of the jack is imperative for water proof applications and for extra safety.

Efficiency Enhancements in Circuit Design

In accordance with an embodiment of the invention, in order for the power efficiency to be maximized and to minimize losses in the coil, the coils should be manufactured to have as low a resistance as possible. This can be achieved by use of more conductive material such as gold, silver, etc. However in many applications, the cost of these materials are prohibitive. In practice, reduced resistivity can be obtained by using thicker copper-clad PCBs. Most common PCBs use 1-2 oz copper PCBs. In accordance with some embodiments the coil PCB used for the wireless charger can be made from PCBs clad with between 2 and 4, or even 6 oz copper. The process of manufacture of the PCB can also be optimized to achieve higher conductivity. For example, sputtered copper has a higher conductivity than rolled copper and is typically better for this application. In operation, the coil and the circuitry demonstrates a resonance at a frequency determined by the parameters of the design of the coil (for example, the number of windings, coil thickness, width, etc.). However, previous work has concentrated on circuits driven by square waves with a MOSFET. This approach has the disadvantage that since a square wave is not a pure sinusoid, it produces harmonics. These harmonics are undesirable because:

The PCB coil produces optimum power transfer efficiency at a particular frequency. The harmonics in the primary signal are not transferred as efficiently and decrease the overall system efficiency.

The rapid voltage change in the leading and falling edge of the square wave creates oscillations that create further harmonics resulting further EMI.

The harmonics radiated by the primary create higher frequency components that contribute to the EMI that is more radiative (due to higher frequency). It is desirable to limit the frequency range of the operation of the overall system to as low a frequency as possible while maintaining the other requirements of the system (such as sufficient working distance, etc.). So these harmonics must be avoided.

At the instance of switch turn-on and turn-off, the change in the in-rush current to the coil causes huge voltage swings across the coil for a short period of time. All the power is transferred to the secondary during these times that are short.

Previous attempts to achieve 90% transfer efficiency with PCB coil primary and receiver have used a laboratory power supply to drive their circuit. While this approach has demonstrated the higher efficiency that can be achieved with a sinusoidal voltage on the coil, such power supplies are complex, costly, and too large to be able to be used for any practical charger application.

Figure 9:
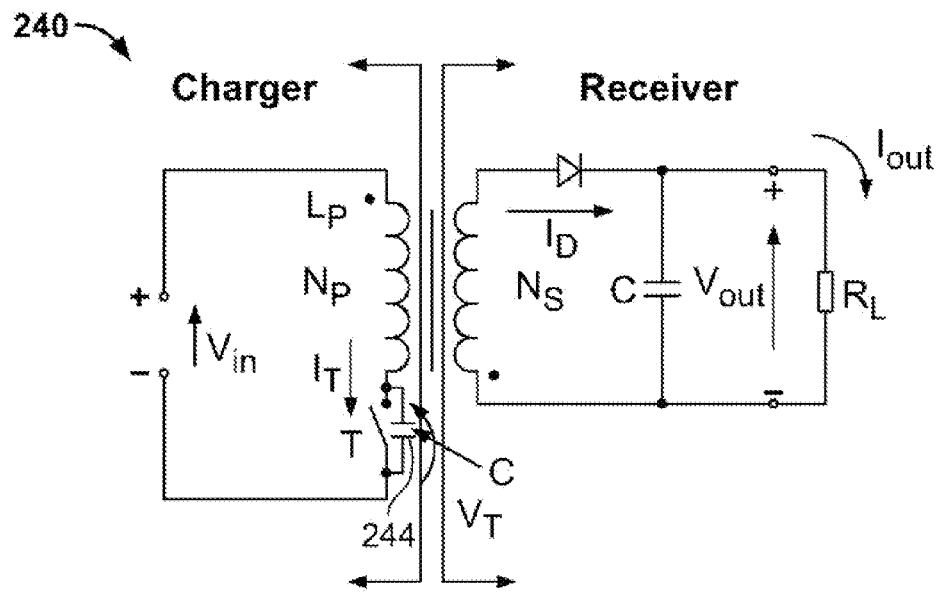
FIG. 9 shows a figure of a circuit diagram in accordance with an embodiment of the invention.

In accordance with an embodiment of the present invention, a capacitor is added in parallel to the drain/source contacts of the MOSFET. FIG. 9 shows a figure of a circuit diagram 240 in accordance with an embodiment. The coil in the wireless charger system is driven by switching the FET at the resonance frequency of the circuit when the receiver is present. Without the receiver nearby, the circuit is detuned from resonance and radiates minimal EMI. The capacitor 244 acts as a reservoir of energy that discharges during switch off time and enhances energy transfer.

By way of example, in accordance with an embodiment that uses an IRFR0220 chip as a FET and use 4 Oz. copper coils with 9 turns and 1.25" diameter, the circuit in FIG. 2 above, can be loaded with RL of 10 Ohm and tuned to operate at 1.3 MHz. With matching coils in the primary and secondary, without capacitor C, total circuit efficiency of the circuit including the clock and FET driver circuit approaches 48%. Addition of a 1600 pF capacitor in parallel to the FET increases the total circuit efficiency to 75% (a better than 50% increase in efficiency), while simultaneously decreasing the voltage across the FET and also the harmonics in the circuit. The coil to coil transfer efficiency with the capacitor placed in parallel with the FET is estimated to be approximately 90%. The advantages of this approach include:

High efficiency (~90% coil to coil).
Low ringing oscillation and EMI.
Simplicity and low cost.
Lower FET source-drain voltage swing allowing use of a larger selection of FETs.

Figure 10:
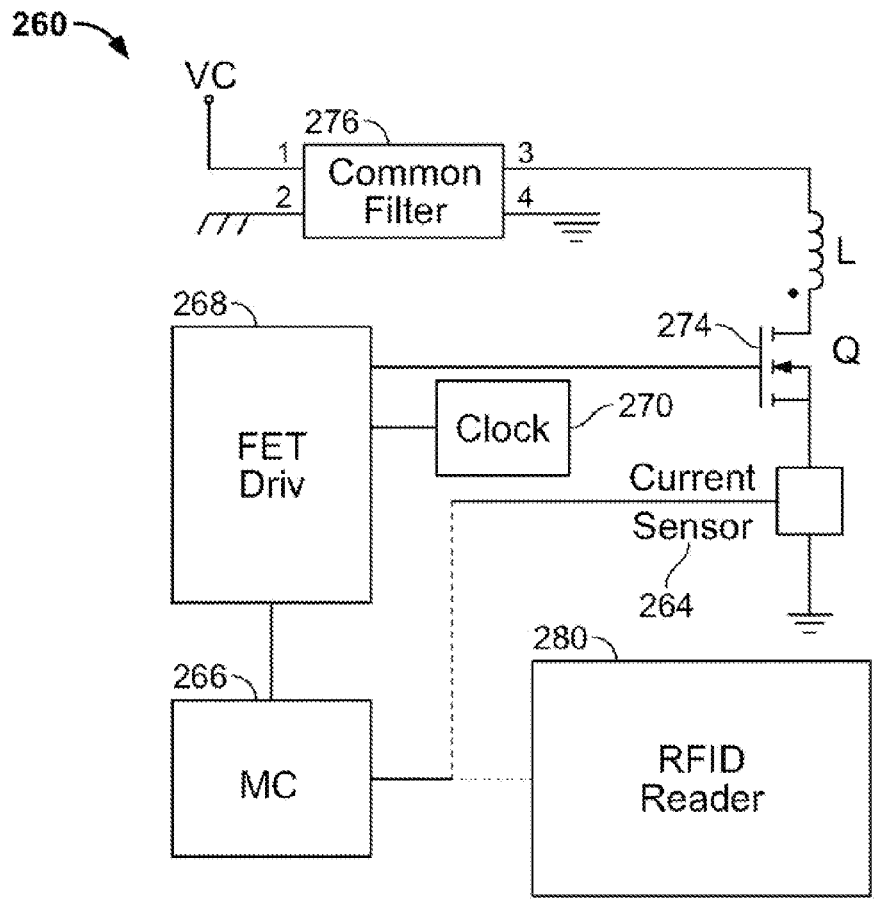
FIG. 10 shows a figure of a circuit diagram in accordance with an embodiment of the invention.
Figure 11:
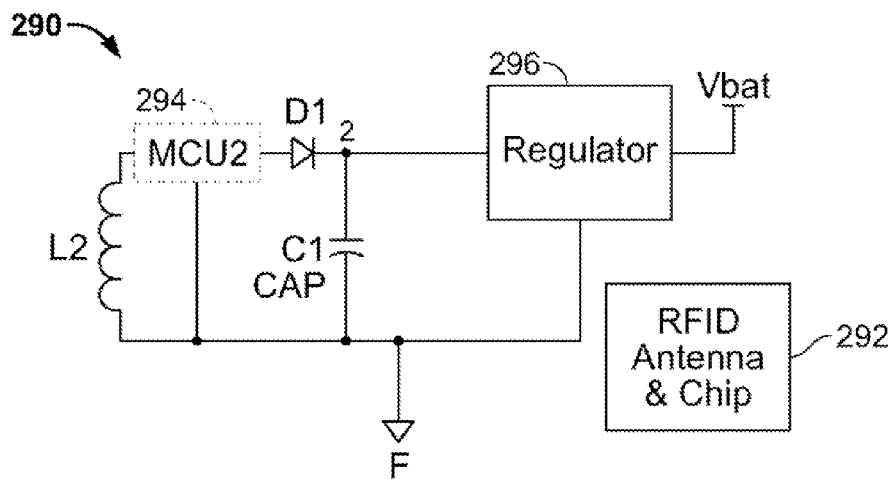
FIG. 11 shows a figure of a circuit diagram in accordance with an embodiment of the invention.

In many applications, it is also desired that the pad and the receiver are arranged so that the pad does not emit power unless the receiver is nearby. FIGS. 10 and 11 show figures of circuit diagrams in accordance with an embodiment of the invention. In addition to high efficiency, one method that is required for minimizing EMI and maintaining high overall efficiency is the ability to recognize the presence of a secondary nearby, and then turning on the pad only when appropriate. Two methods for this are shown in FIGS. 10 and 11.

As shown in FIG. 10, in accordance with one embodiment, the pad circuit 260 incorporates a micro control unit (MCU1) 266 that can enable or disable the FET driver 268. The MCU1 receives input from another sensor mechanism that will provide information that it can then use to decide whether a device is nearby, what voltage the device requires, and/or to authenticate the device to be charged.

One of the sensor mechanisms for this information are through the use of an RFID reader 280 that can detect an RFID tag of circuit and antenna in the secondary (i.e. device to be charged). The information on the tag can be detected to identify the voltage in the secondary required and to authenticate the circuit to be genuine or under license. The information on the tag can be encrypted to provide further security. Once a device containing the tag is nearby the pad, the RFID reader can be activated, read the information on the tag memory and compare with a table to determine authenticity/voltage required or other info. This information table can also reside on the MCU1 memory. Once the information is read and verified, the MCU1 can enable the FET driver to start driving the coil on the pad and to energize the receiver.

In another embodiment the MCU1 relies on a clock 270 to periodically start the FET driver. The current through the FET driver is monitored through a current sensor 264. Several methods can be implemented with this implementation, including for example:

A small resistor can be placed in series with the FET to ground contact. The voltage across this resistor can be measured by a current sensor chip, such as a Linear Technology Current Sense Amplifier part number LT1787.

A Hall sensor, such as a Sentron CSA-1A, that measures the current from a wire running under it, can be placed on top of the PCB line from the FET to the ground to measure the current without any electrical connection to the circuit. The advantage of this approach is that no extra resistor in series with this portion of the circuit is necessary reducing the impedance.

Other techniques may be used to measure the current.

A Hall sensor or a Reed switch can sense a magnetic field. If a small magnet is placed inside the receiver unit of the system, a Hall sensor or Reed switch can be used to sense presence of the magnet and can be used as a signal to start the FET.

Other capacitance, optical, magnetic, or weight, etc. sensors can be incorporated to sense the presence of a secondary or receiver and to begin the energy transfer process.

FIG. 11 shows a figure of a circuit diagram 290 in accordance with an embodiment of the invention. In accordance with an embodiment, the MCU1 can periodically start the FET driver. If there is a receiver nearby, it can power the circuit. The regulator 296, or another memory chip in the circuit can be programmed so that on power-up, it draws current in a pre-programmed manner. An example is the integration of an RFID transponder chip in the path, such as ATMEL e5530 or another inexpensive microcontroller (shown here as MCU2 294), that upon power-up modulates the current in the secondary that can then be detected as current modulation in the primary. As with the previous example, other sensors, such as an RFID antenna 292 can also be used to provide positional and other information.

Figure 12:
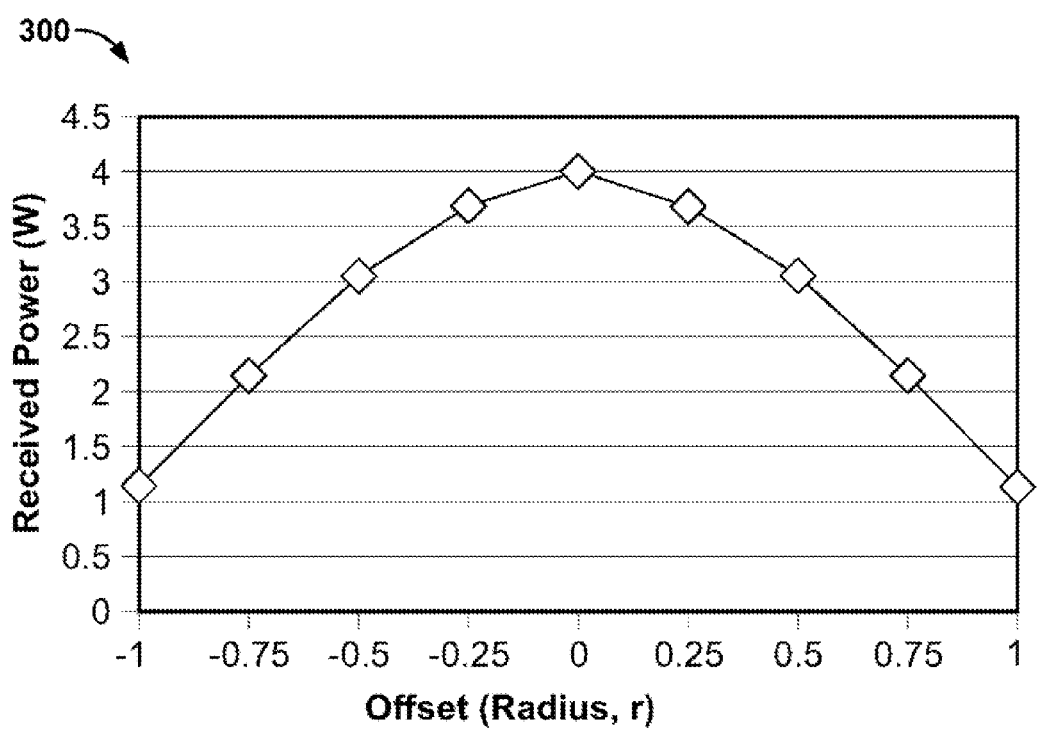
FIG. 12 shows a figure of power transfer chart in accordance with an embodiment of the invention.

FIG. 12 shows a figure of a power transfer chart 300 in accordance with an embodiment of the invention, illustrating transferred power as a function of offset between coils.

Efficiency Enhancements in Coil Layout

Figure 13:
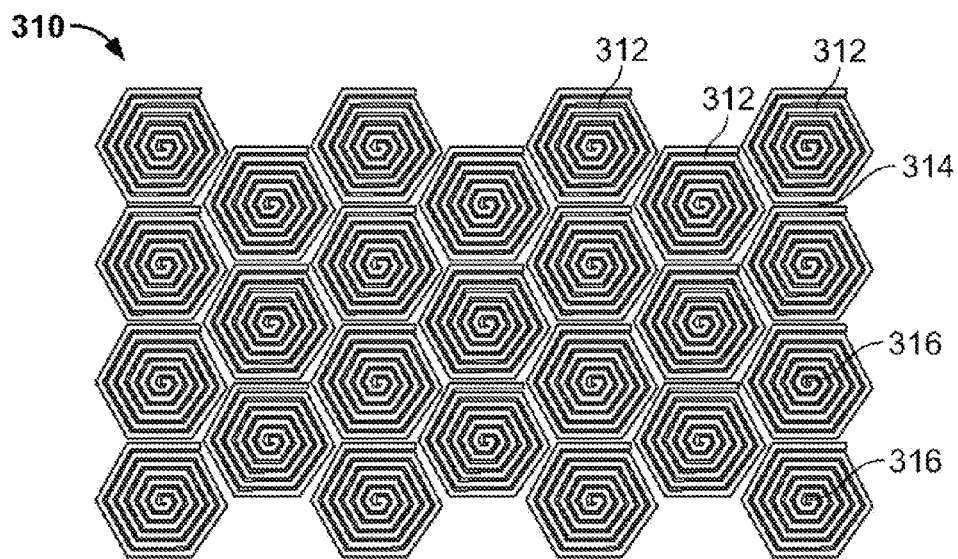
FIG. 13 shows a figure of a coil layout in accordance with an embodiment of the invention.
Figure 14:
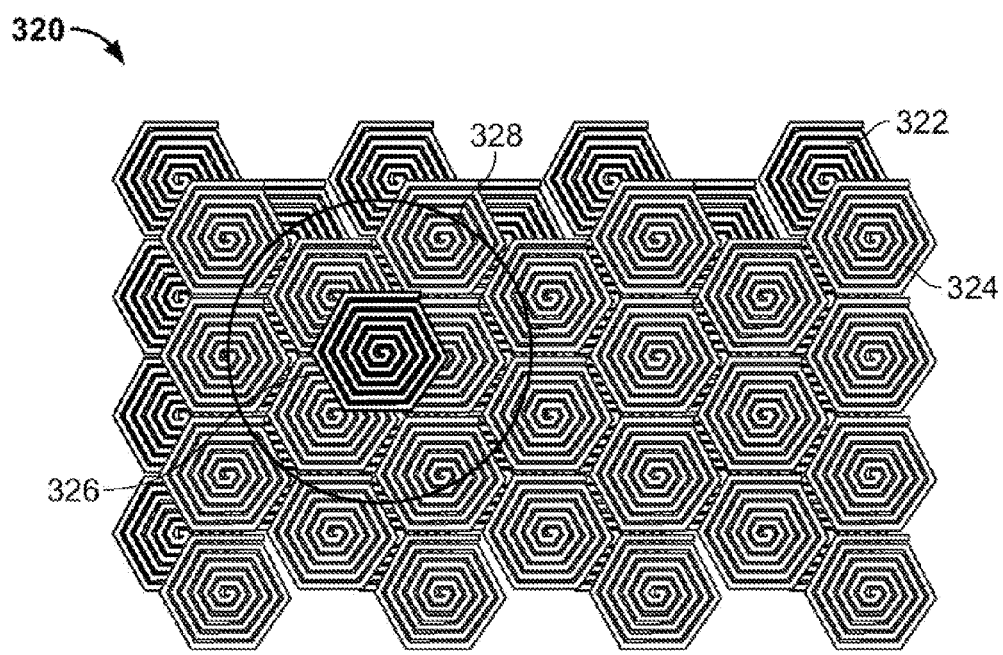
FIG. 14 shows a figure of a coil layout in accordance with an embodiment of the invention.

An important aspect of power transfer efficiency relates to the alignment of coils with respect to each other. FIGS. 13 and 14 show figures of a coil layout in accordance with an embodiment of the invention. If position independence is required, the pad PCB can be patterned with a coil pattern to cover the full area. FIG. 13 shows a pad type charger 310 including a layer of coils 312 with minimal spacing 314 between the coils. Each coil has a center 316 associated with it. The power transfer for a 1.25" diameter coil as the center of the secondary is offset from the center of primary. The power drops off to 25% of the maximum value when the two coils are offset by a coil radius. As described above, in order to better keep the coils aligned, use of magnets centered on the primary and the secondary coil can provide an automatic method of bringing the two parts into alignment.

In order to produce uniform fields, a number of coils around the secondary would typically need to be turned on to produce a field. However, with such a pattern, if a secondary coil is placed in between two primary coils, the voltage is still not optimized. Research has shown that to obtain uniform fields, three layers of coil patterns offset with respect to each other are required.

FIG. 14 shows a pad-type charger 320 with two of the three layers 322, 324 required to achieve position independent magnetic field pattern. For a secondary placed at the center of the circle, all the coils nearby (in and around the circle 328) will need to be turned on to achieve a uniform field in the desired location 326. While this approach solves the offset issue and can be used to provide position independence, it does not produce high transfer efficiency. The reason is that ten or more coils have to be turned on near the secondary center to create the uniform field in that area, which in turn leads to inefficient power transfer.

Efficiency Enhancements in Independent Coil Movement

Figure 15:
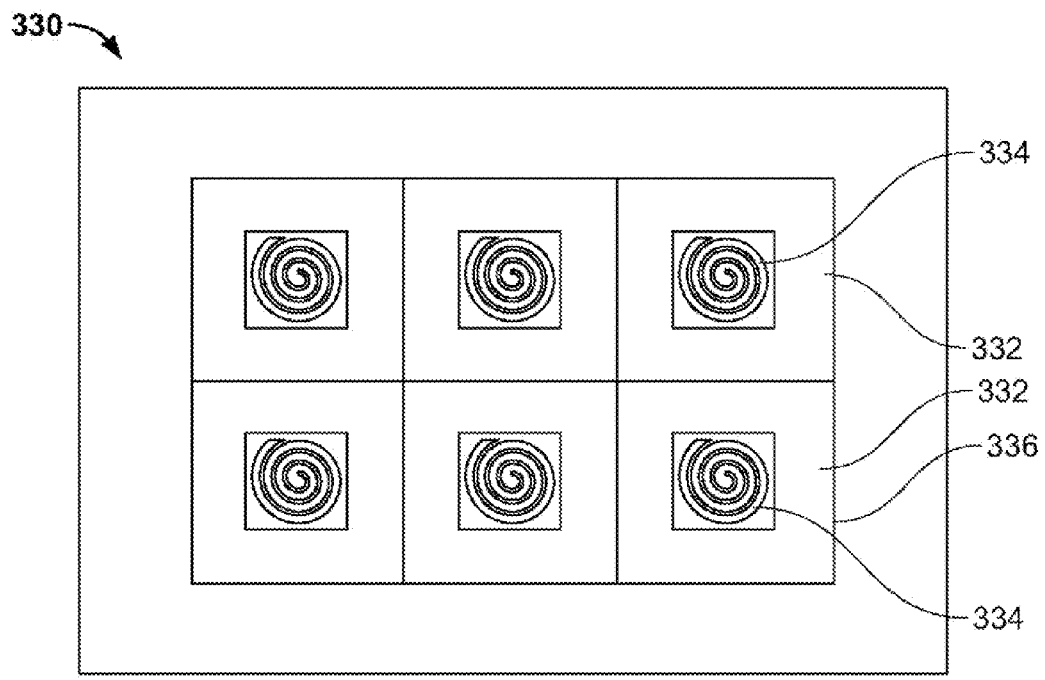
FIG. 15 shows a figure of a charging pad with multiple coils in accordance with an embodiment of the invention.

In accordance with some embodiments, techniques are included to provide high transfer efficiency while maintaining position independence. FIG. 15 shows a figure of a charging pad with multiple coils in accordance with an embodiment of the invention. The area of the pad 330 is divided into a plurality of, or multiple segments 332, that are bounded 336 by a wall or physical barrier, or simply some tethering means with no physical walls but that otherwise restrict movement to within the segment. The coils 334 are mounted such that they can move laterally, or float, within the area of their segments while continuing to be connected to the drive electronics placed on the edges of the area. In accordance with an embodiment, the floating coils and the drive circuit are sandwiched between thin upper and lower cover layers that act to allow the coils lateral movement while limiting vertical movement. When a secondary is placed on the pad, the pad senses the position of the secondary coil and moves the coils to the right position to optimize power transfer.

Figure 16:
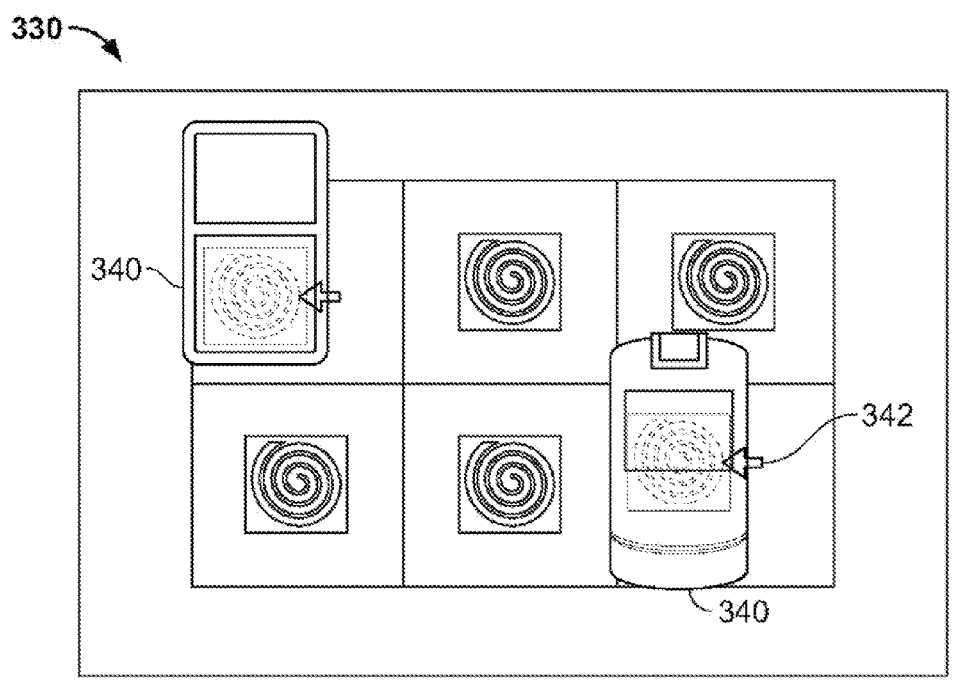
FIG. 16 shows a figure of a charging pad with movable coils in accordance with an embodiment of the invention.

FIG. 16 shows a figure of a charging pad with movable coils in accordance with an embodiment of the invention. When the mobile device, for example a cell phone 340, is placed on the pad 330, the nearest coil moves 342 within its segment to better orient itself with the mobile device. In accordance with one embodiment, the method used for achieving this is by attaching a magnet to the bottom center of each coil in the pad. A matching magnet at the center of the receiver coil attracts the primary magnet nearby and centers it automatically with respect to the secondary.

In accordance with an embodiment, each coil in this configuration can be suspended by the wires carrying power to the coil or by a separate wire/spring or by another mechanism so that each coil can move freely in the plane of the pad while it can receive power from an individual or shared driving circuit. In order to facilitate movement, the surface of the coils or the bottom surface of the top layer for the base unit (the area where the coils move against) or both layers can be made smooth by use of a low friction material, attachment of a low friction material, or lubrication. The wire/spring or current carrying mechanism described above can also be used to center each coil in an area at the center of desired movement sector for each coil. In this way, without a secondary coil in the vicinity, each coil in the base unit stays at the central location of its sector and responds and moves to match a secondary coil when a device is brought nearby. Overlap of movement between adjacent base unit coils can be controlled by limiting movement through limiting length of current carrying wires to the coil, arrangement of the suspension, or spring, or placement of dividing sectors, pillars or by any other mechanism.

In another embodiment, the pad will include a method for detecting the presence of the mobile device/receiver and taking appropriate action to turn on the coil and/or to drive the coil with the appropriate pattern to generate the required voltage in the receiver. This can be achieved through incorporation of RFID, proximity sensor, current sensor, etc. A sequence of events to enable position independence and automatic pad turn-on can be:

- Multiple movable coils are used to cover the pad surface area.
- The coils in the pad are normally off and periodically powered up sequentially to sense whether the secondary is nearby by measuring the current through the primary coil. Alternatively, proximity sensors under each section can sense the presence of a magnet or change in capacitance or other parameter to know where a device is placed. RFID techniques with localized antennas under each section or such can also be used.
- Once a device is identified as placed in a section, the pad can interrogate the device through one of the processes described earlier to authenticate and to understand its voltage/power, etc. requirements.
- The MCU1 unit uses the information received above to set the PWM pattern which it will use to drive the FET drive to produce the appropriate voltage in the receiver.
- The board continues to 'search' for other devices on the pad by scanning coils or using the RFID system, etc. and then turn on other coils as appropriate.
- The pad also use the monitoring to find out when and if the first mobile device is removed from the pad or end of charge is reached.

Efficiency Enhancements in Coil Registration and Switching

In accordance with an embodiment, a global RFID system that would identify the approach of a mobile device to the pad can be used to 'wake up' the board. This can be followed by sequential polling of individual coils to recognize where the device is placed in a manner similar to described above. Other embodiments of the invention provide safeguards against false charging of objects placed on the base unit. It is known that a metal object placed on coils such as the ones in the base of the charger system would cause current to flow in the primary and transfer power dissipated as heat to the metal object. In practical situations, this would cause placement of keys and other metal objects on the base unit to trigger a start and to needlessly draw current from the base unit coil and possibly lead to failure due to over-heating. To avoid this situation, in a system as described above, the switching of voltage to the coil would not start unless an electronic device with a verifiable RFID tag is nearby thereby triggering the sequence of events for recognizing the appropriate coil to turn on and operate. In an alternate geometry, the total system current or individual coil current is monitored, and, if a sudden unexpected drawn current is noticed, measures to investigate further or to shut down the appropriate coil indefinitely or for a period of time or to indicate an alarm would be taken.

In another embodiment, the regulators or battery charging circuit in mobile devices or regulator in a receiver electronics typically has a start voltage (such as 5 V) that is required to start the charging process. Once the battery charge circuit detects the presence of this voltage, it switches on and then proceeds to draw current at a preset rate from the input to feed the battery for charging. The battery charger circuits operate such that an under or over voltage at the start will prevent startup. Once the startup occurs, the voltage at the battery charger output is typically the voltage of the battery and depends on the state of charge, but is for example 4.4 V to 3.7V or lower for Lithium-Ion batteries. With a wireless charge system such as described here, the voltage on the secondary is highly dependent on relative position of the primary and secondary coil as shown in FIG. 5. Since typically the start voltage of the battery charger is within a narrow range of the specified voltage, under-voltage and over-voltage in the receiver coil due to mis-alignment or other variation will result in shutdown of the battery charger circuit.

Efficiency Enhancements in Coil Voltage Clamping

Figure 17:
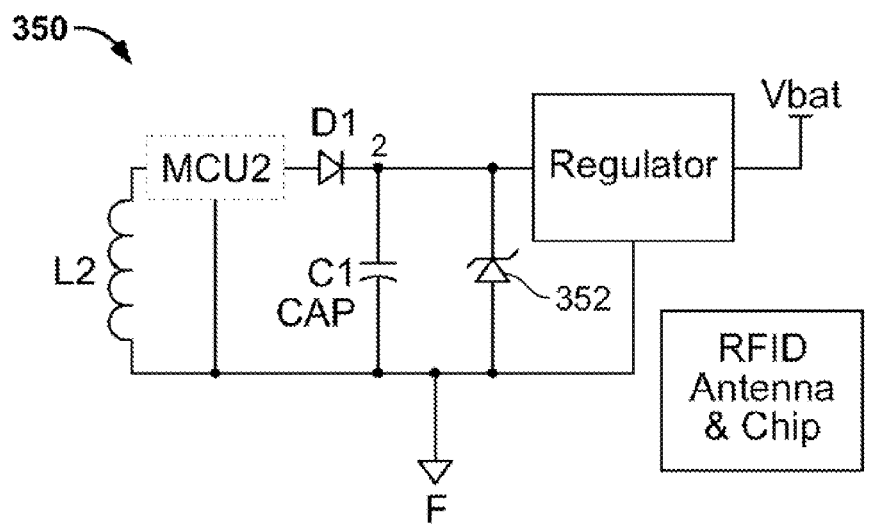
FIG. 17 shows a figure of a circuit diagram in accordance with an embodiment of the invention.

FIG. 17 shows a figure of a circuit diagram 350 in accordance with an embodiment of the invention. In accordance with one embodiment, a Zener diode 352 is incorporated to clamp the maximum voltage at the output of the receiver prior to the regulator or battery charger circuit, as shown in FIG. 17. Using a Zener allows more insensitivity to placement between the primary and secondary coil while maintaining the ability to charge the device. For example, the drive pattern on the primary can be set so that when the primary and secondary coil are aligned, the voltage on the secondary is above the nominal voltage for the battery charger startup. For example, for a 5 V startup, the voltage at center can be set for 6 or 7 volts. In this way, the Zener can be chosen to have an appropriate value (5 V) and clamp the voltage at this value at the input to the battery charger unit while the coils are centered or mis-aligned. Once the battery charger starts operation after detection of the appropriate voltage at the input, the battery charger circuitry would pull the voltage at this point to the pre-programmed voltage or voltage of the battery. In this way, the use of Zener diode would enable less sensitivity to position and other operational parameters in wireless chargers and would be extremely useful.

Efficiency Enhancements in Coil Stacking

Figure 18:
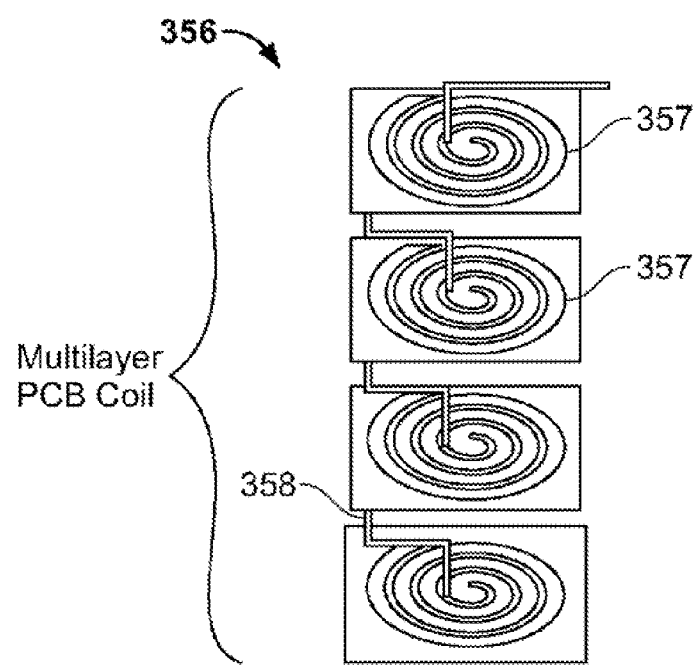
FIG. 18 shows an illustration of a means of stacking coils, in accordance with an embodiment of the invention.

FIG. 18 shows an illustration of a means of stacking coils, in accordance with an embodiment of the invention. In accordance with an embodiment, to achieve higher flux densities, a coil is constructed with two or more layers, for example by using two or more layers of printed circuit board. Multiple layer boards can be used to allow compact fabrication of high flux density coils. By altering the dimensions of the coil in each layer (including the thickness, width, and number of turns) and by stacking multiple layers, the resistance, inductance, flux density, and coupling efficiency for the coils can be adjusted so as to be optimized for a particular application.

In accordance with an embodiment, a transformer consisting of two PCB coils separated by a distance has many parameters that are defined by the design of the coil, including:

R1 is the primary winding resistance,
R'2 is the secondary winding resistance referred to the primary,
RL is the resistive load,
Llk1 is the primary leakage inductance,
L'lk2 is the secondary leakage inductance referred to the primary,
LM1 is the primary mutual inductance,
C1 is the primary winding capacitance,
C'2 is the capacitance in the secondary winding referred to the primary,
C12 is the capacitance between primary and secondary windings, and
n is the turns ratio.

In accordance with the embodiment shown in FIG. 18, a multi-layer PCB coil 356 is created in separate PCB layers 357, which are then connected 358, and manufactured together via common techniques used in PCB fabrication, for example by use of vias and contacts. The resulting overall stack is a thin multi-layer PCB that contains many turns of the coil. In this way, wide coils (low resistance) can be used, while the overall width of the coil is not increased. This technique can be particularly useful for cases where small x-y coil dimensions are desired, and can be used to create higher flux densities and more efficient power transfer.

Inductive Charger with Self-Powered Operation

Figure 19:
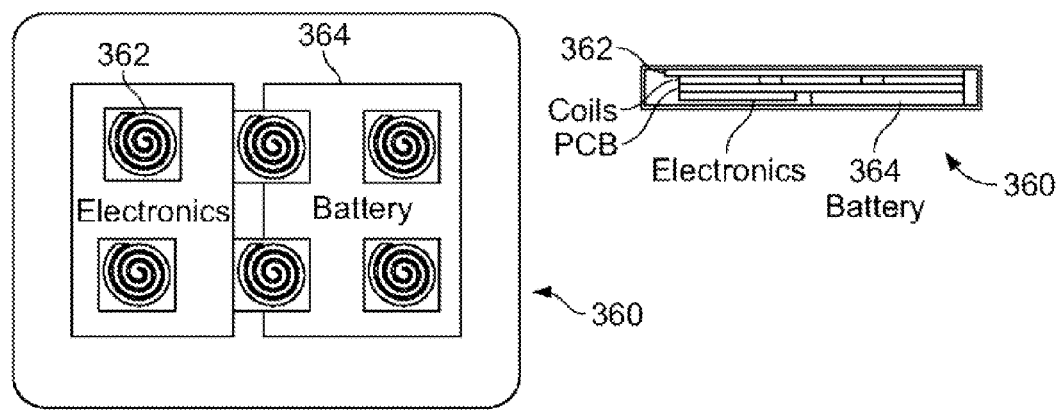
FIG. 19 shows an illustration of a device for inductive power charging that includes an internal battery for self-powered operation, in accordance with an embodiment of the invention.

FIG. 19 shows an illustration of a device for inductive power charging that includes an internal battery for self-powered operation, in accordance with an embodiment of the invention. As shown in FIG. 19, an inductive charging unit such as an inductive pad 360 includes a rechargeable battery 364. The unit is normally operated with, or is occasionally coupled to, power input from an electrical outlet, or from a dc source such as a car 12 volt dc outlet, or from an outlet in an airplane or an external dc source, or from another power source such as the USB outlet from a computer or other device. Alternatively, the power can come from a mechanical source such as a windmill, or a human-powered crank handle. The unit can include coils 362 that are energized to transfer power to secondary coils in mobile electronics devices such as mobile phones, MP3 players, radios, cd players, PDAs, and notebook computers. At the same time, the input power charges the rechargeable battery inside the unit itself. When the external power source to the unit is disconnected, or when no input power is provided, the unit automatically switches its operation from its charged internal battery. Alternatively, the unit's operation can be switch-operated by user. In this way, users can continue to charge their devices by placement on the unit without any outside power source. This use can continue until the external power is restored or until the internal battery is completely discharged.

The ability of the unit to continue charging would depend on the capacity of the battery included. Thus, for example, with a 1500 mAH internal battery, the unit would be able to charge a mobile phone with a 1000 mAH battery completely if the losses due to conversion efficiency, operation of the circuitry in the unit, and other losses are up to 500 mAH.

In other embodiments of the invention, the unit can be powered by other power sources such as a fuel cell that generates power from methanol or other sources. The unit can also be connected to the electric grid through an outlet or to an external DC power source such as power from an outlet in a car or airplane or be itself charged or powered inductively by another unit. However, when not connected to outside power, the unit can be powered by its internal power generator from the fuel cell and can charge devices placed on it inductively.

Figure 20:
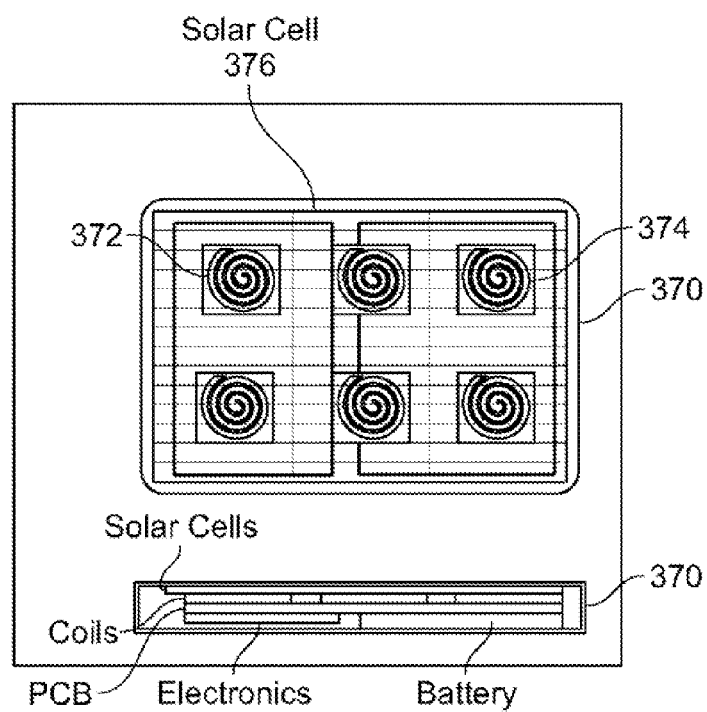
FIG. 20 shows an illustration of an inductive charger unit with a solar cell power source for self powered operation, in accordance with an embodiment of the invention.

FIG. 20 shows an illustration of an alternate embodiment of an inductive charger unit or pad 370 with a solar cell power source for self powered operation, in accordance with an embodiment of the invention. As shown in FIG. 20, the surface of the unit can be covered by a solar panel or solar cell 376. In normal operation, the unit can be powered-up or charged by connection to an electric outlet or external DC source. But without external electric power, the panel generates electric power that is used to power the charger which in turn can charge devices placed on it through the inductors in the unit. In some embodiments the unit can also include a rechargeable battery 374 that can be charged when the unit is either connected to external electric power or charged by the solar cells on the surface of the unit. This battery can then operate the unit when the unit is either not connected to external electric power or the solar cell is not generating enough power to run the unit such as during operation at night.

Figure 21:
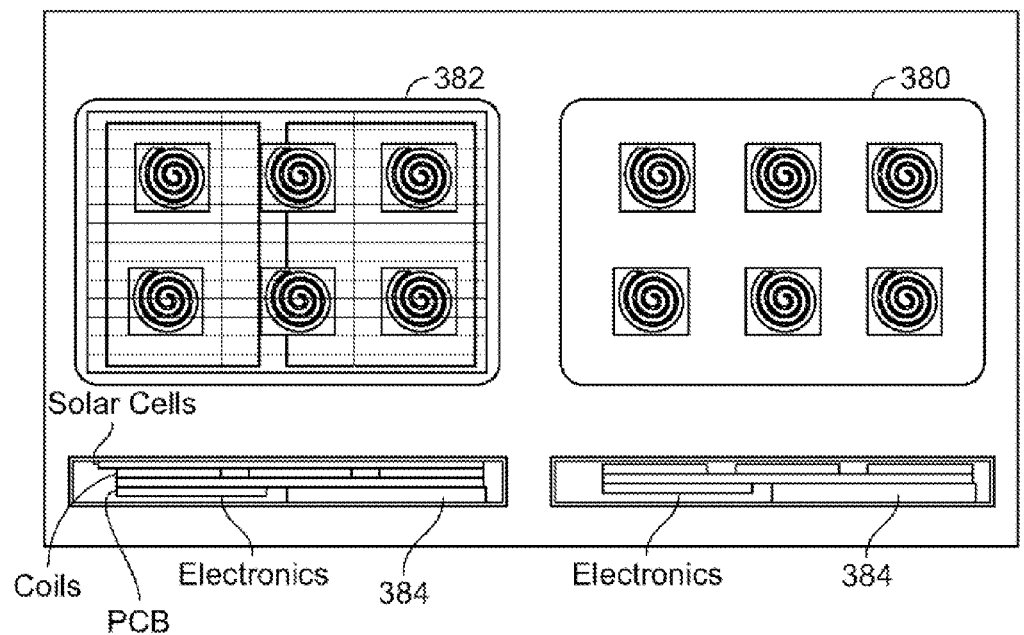
FIG. 21 shows an illustration of an inductive charger unit with an incorporated communications and/or storage unit, in accordance with an embodiment of the invention.

FIG. 21 shows an illustration of an inductive charger unit with an incorporated communications and/or storage unit, in accordance with an embodiment of the invention. As shown in FIG. 21, in accordance with some embodiments the charger, including for example the regular charger 380, and the solar-cell powered charger 382, can further comprise an optional communications and/or storage unit, for storage of data and transmission of data to and from a mobile device being charged. Examples of components that can be incorporated include Bluetooth, Near-field Communications (NFC), WiFi, WiMax, wireless USB, and proprietary communications capabilities, including means of connecting to the Internet.

Inductive Charger Applications and Kiosk

The technology described herein may also be used for other applications. In some applications, it may be desirable to build the inductive (as described above) or wire free charger into a case for an electronic device, a briefcase, or other carrier such as a box, holder, or container in a car or otherwise. An example can be a brief case, hand bag, or back pack where the bottom part or the outside surface has an integrated charger. Any device enabled to receive power from such a charger (device containing coils and the appropriate electronics to receive power or with appropriate contacts for wire free charging) can be placed on or inside such a briefcase and be charged. The charging circuitry can be powered by plugging the briefcase, handbag, or back pack into an outlet power or having internal batteries that can be charged through power from a wall plug or by themselves being inductively charged when the briefcase, handbag, or backpack is placed on an another inductive or wire free charger. Uses can be applied to any bag, container, or object that can be used to essentially charge or power another device. This first object can itself be charged or powered through an outlet directly by wires or wirelessly through an inductive or wire free charging system. As an alternative, the first object (the charger) can be powered by solar cells, Fuel cells, mechanical methods (hand cranks, pendulums, etc.).

In all of the above case, it is possible for the functions of the inductor or wire free charger and the power source for the charger (battery, fuel cell, solar cell, etc.) to be separated. Furthermore, in some cases, the charger part can be separated from a portable power source to operate it (such as a rechargeable battery) which is in turn powered or charged by another source (power outlet, fuel cell, solar cell, mechanical source, etc.). The three parts can be in the same enclosure or area or separate from each other.

An additional example may be an after market inductive or wire free charger for a car where the inductive or wire free charger or pad including a solar cell on the pad or in another area and connected to the pad by wires is used to charge mobile devices. Such a device placed on the dashboard or tray between seats or a special compartment can be used to charge a number of devices such as phones, MP3 players, cameras, etc. Devices such as GPS navigation systems, radar detectors, etc. can also be powered from such a device. In another application, mugs, cups, or other containers with a receiver circuitry and means of heating or cooling the contents can be used in combination with the inductive charger to keep the contents hot or cold. A dial or buttons on the cup or container can set the temperature. The charging device or pad can also contain rechargeable batteries that allow the device or pad to store energy and operate in the absence of any external power if necessary.

Other applications of this technology include clothing, jackets, vests, etc. that have an integrated inductive charger such that a user can power or charge a device by simply placing it on or near a pocket or an area where wireless inductive power is available. The jacket or clothing can in turn be powered by solar cells, Fuel cells, batteries, or other forms of energy. It can also be powered by batteries that would be recharged through solar cells sown onto the clothing or be recharged by placing or hanging the clothing item on a rack or location where it is recharged wirelessly or inductively. By using inductive charging, the user does not have to plug in devices into individual wires and connectors at the appropriate jacket pocket.

In some cases, it may be desirable to build the charger or the secondary part (receiver for a charger) into the protective case of another device. For example, many products exist today that are after-market or optional items such as a skin or case for a music player, phone, PDA, or notebook computer. In one implementation, the case or skin can contain the electronics and the coil necessary to allow the device to be charged or charge other devices or both. The charger can be powered by the device it is attached to or can receive power from a separate source such as a solar cell, fuel cell, etc. that is integrated with the charger or in another location and electrically connected to the charger. For example, in a briefcase, while the charger is inside the briefcase and can charge devices inside, the surface of the briefcase can have solar cells that would power the charger inside. The briefcase can also contain rechargeable batteries that would store power generated by the solar cells and use them when necessary to charge devices inside. Similarly, the charger can be built on the outside or inside surface of the case and charge devices placed on or near the surface.

It is also possible to provide a charger with modular components that allow other capabilities to be added later or simultaneously as an option. In one embodiment, an inductive charging pad that contains a rechargeable battery can have a separate top surface module or all around cover or skin that contains a solar cell array and would simultaneously electrically connect to the charger pad to enable the battery internal to the unit to be charged without any external power input. It is also possible to have the cover or the outside skin to provide other capabilities such as communications, or simply provide a different look or texture so that the pad fits in with the user's taste or décor.

Figure 22:
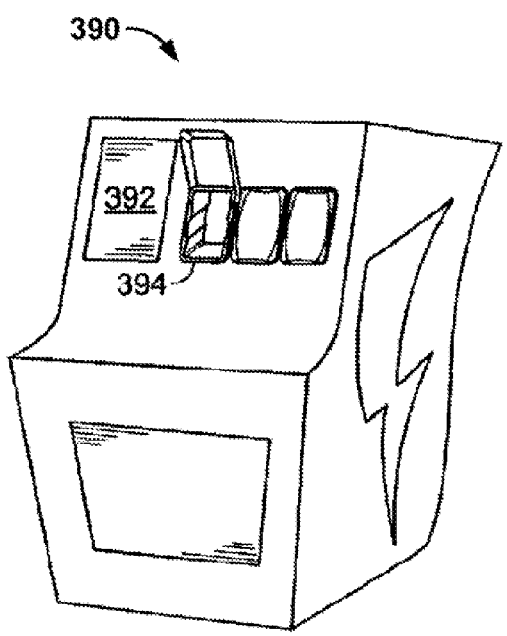
FIG. 22 shows an illustration of a kiosk that incorporates an inductive charger unit in accordance with an embodiment of the invention.

FIG. 22 shows an illustration of a kiosk that incorporates an inductive charger unit in accordance with an embodiment of the invention. As shown in FIG. 22, the kiosk 390 includes a control screen 392 and an inductive charging pad 394, to allow individuals to walk-up and purchase an occasional charge for their mobile device. Currently, the usage model of typical mobile user consists of charging their most essential device (phone, MP3 player, Bluetooth headset, etc.) during the night or at the office or car. In cases where the user is outside their environment for a long time such as traveling, this may not be possible. A variety of public mobile device charging stations have appeared that allow the user to charge their device in a public setting by paying a fee. An inductive or wire free public charging station or kiosk would allow the user to place their mobile device that is 'enabled' (i.e. has the appropriate receiver or components to allow it to receive power from the charger) on or in the wire free or inductive charger station and charge the device. The customer can pay for the service or receive the service for free depending on the service providers' approach. The payment can be cash, credit card, debit card, or other methods.

In accordance with an embodiment, a single pad with multiple stations can charge multiplicity of devices simultaneously. The user may be asked to pay for the service before charging a device or the service may be for free. Alternatively, each charging station can be in a compartment and the device is secured by a door that can only be opened through a code given to the device owner when charging starts or payment occurs. The door can also be secured by a combination lock or physical key.

Alternatively, the charging station or kiosk can be open and not physically secure but when the user pays for the service, a code is issued. The user proceeds to place their device to be charged but when the charging ends or the user wants to pick up the device, the code must be entered first. If no code is entered, an alarm is sounded or the device is deactivated or some other warning occurs. In this way, a thief or the wrong user can not remove the device without attracting attention that may act as a deterrent. A combination of the above techniques may be used in implementing a public charging kiosk.

Since a typical charging process can take up to 30 minutes or more, it is possible to also synchronize data, download songs, movies, etc. into the device during this time. Many of current mobile devices have Bluetooth or WiFi capability. Other communication protocols such as WiMax can increase the data rate further. By combining the charging and information transfer process, the service provider can charge for additional services. In addition, if a camera is being charged and has wireless capability, it can download the pictures or movies to a designated website or online storage area or be emailed to a designated email address while charging. In this way, a traveler can simultaneously charge a camera while downloading the contents of its memory to a location with larger memory. This would enable the traveler to free up limited memory space in their camera or other mobile device. Such a service would enable devices that have limited or short range wireless communication capabilities (such as mobile phones, MP3 players, cameras, etc.) to be able to connect to the internet and send or receive data indirectly. It is important to recognize that without the charging capability, a device conducting such downloading or synchronization through an intermediate device (Bluetooth to internet gateway for example) would often run out of power due to the length of time this would take. In this manner the charging capability of the kiosk enables a more effective operation.

The foregoing description of the present invention has been provided for the purposes of illustration and description. It is not intended to be exhaustive or to limit the invention to the precise forms disclosed. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

Some aspects of the present invention may be conveniently implemented using a conventional general purpose or a specialized digital computer, microprocessor, or electronic circuitry programmed according to the teachings of the present disclosure. Appropriate software coding can readily be prepared by skilled programmers and circuit designers based on the teachings of the present disclosure, as will be apparent to those skilled in the art.

In some embodiments, the present invention includes a computer program product which is a storage medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. Particularly, while the embodiments of the systems and methods described above are described in the context of charging pads, it will be evident that the system and methods may be used with other types of chargers. Similarly, while the embodiments described above are described in the context of charging mobile devices, other types of devices can be used. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A charger system for use with a mobile device or battery for charging or powering the mobile device or battery inductively, comprising:
   a base unit comprising
      one or more primary coils, wherein each of the primary coils is associated with a switching circuit in the base unit, which switching circuit is capable of being selectively switched to activate its associated primary coil so that, when an electrical current is passed through an activated primary coil, a magnetic field is generated by that activated primary coil, and
      a power supply for passing a current through the one or more primary coils when activated to generate a magnetic field in a direction substantially perpendicular to a surface of the base unit;
   a communications interface that the base unit, and a mobile device, battery, battery door, or skin use to communicate with each other during powering or charging, to
      verify the presence of the mobile device, battery, battery door, or skin associated therewith placed upon or close to the surface of the base unit,
      select and selectively switch, using their associated switching circuits to activate, a selection of the one or more primary coils which are determined to be most closely aligned with a receiver coil at the mobile device, battery, battery door, or skin associated therewith, and
      periodically exchange information for use with providing power transfer to the mobile device or battery; and
   wherein the magnetic field is used to inductively generate a current in one or more receiver coils within one or more mobile devices placed close to the base unit, to charge or power the mobile device or battery.

2. The system of claim 1, wherein one or more of the primary and receiver coils comprise substantially spiral shapes.

3. The system of claim 1, wherein the base unit includes a switch for automatically switching the primary coils on whenever a mobile device or battery is placed close to the primary coil of the base unit and the presence of the mobile device or battery is detected.

4. The system of claim 1, wherein the base unit includes multiple primary coils that can be used to simultaneously charge multiple mobile devices or batteries.

5. The system of claim 1 wherein the base unit is formed in the shape of a pad and wherein multiple primary coils are distributed within overlapping layers of coils within the pad.

6. The system of claim 5, wherein the multiple primary coils are allowed to move within a degree of freedom within their plane to more closely align the primary coil with the receiver coil of a mobile device or battery.

7. The system of claim 1, further comprising a data storage component for storage of data, for subsequent transmission of data to or from the mobile device.

8. The system of claim 1, wherein the base unit is integrated into a charging kiosk for occasional charging of mobile devices or batteries.

9. The system of claim 1 wherein one or more of the primary coils are stacked atop one another to increase transfer efficiency.

10. The system of claim 1, wherein the base unit senses the location of the mobile device or battery and activates a primary coil near the mobile device or battery, by sensing a change in a resonant circuit in the base unit when the mobile device or battery is in proximity to the primary coil.

11. The system of claim 1, wherein the base unit is formed in the shape of a cup, bowl, or other container, and wherein mobile devices or batteries can be placed inside to be charged or powered inductively.

12. The system of claim 1, wherein a plurality of modular base units can be interconnected to form a larger single base unit.

13. A mobile device or battery capable of being inductively powered or charged comprising:
   a battery for powering a mobile device; and
   a receiver that is one of attached to, incorporated within, or coupled to the mobile device or the battery, wherein the receiver comprises a receiver coil that inductively receives energy from a substantially perpendicular magnetic field generated by a base unit when the mobile device is placed close to the base unit, and wherein the energy so received is used to generate a current in the receiver coil and to charge or power the mobile device
   wherein the base unit comprises one or more primary coils, wherein each of the primary coils is associated with a switching circuit in the base unit, which switching circuit is capable of being selectively switched to activate its associated primary coil so that, when an electrical current is passed through an activated primary coil, a magnetic field is generated by that activated primary coil, and
   wherein the base unit, mobile device, or battery includes a communications interface that the base unit and the mobile device or battery use to communicate with each other during powering or charging, to
   verify the presence of the mobile device, battery, battery door, or skin associated therewith placed upon or close to the surface of the base unit,
   select and selectively switch, using their associated switching circuits to activate, a selection of the one or more primary coils which are determined to be most closely aligned with a receiver coil at the mobile device, battery, battery door, or skin associated therewith, and
   periodically exchange information for use with providing power transfer to the mobile device or battery.

14. The mobile device or battery of claim 13, wherein the receiver is formed of a flexible printed circuit board material and can be shaped to fit the mobile device or battery.

15. The mobile device or battery of claim 13, wherein the receiver coil comprises a substantially spiral shape.

16. The mobile device of claim 13, wherein the mobile device is one of a phone, kitchen appliance, dish, toy, cup, mug, glass, cup, mug, glass, plate, cooking pot, cooking pan, blender, mixer, can opener, office equipment, lamp, printer, computer, copier, fax machine, or scanner.

17. The mobile device of claim 13, wherein the mobile device is an RFID tag device which includes an internal battery.

18. The mobile device of claim 13, wherein the mobile device includes a replacement battery compatible with an original battery for the device, and wherein the receiver is incorporated into the replacement battery and directly powers or charges the replacement battery when used in the mobile device and with the base unit.

19. The mobile device of claim 13, wherein the mobile device includes a shell covering the battery, and wherein the receiver is attached to or incorporated within the shell and is coupled to the battery to power or charge the battery when used in the mobile device and with the base unit.

20. A system for simultaneously charging or powering a plurality of mobile devices or batteries inductively, comprising:
   a base unit comprising
      one or more primary coils, wherein each of the primary coils is associated with a switching circuit in the base unit, which switching circuit is capable of being selectively switched to activate its associated primary coil so that, when an electrical current is passed through an activated primary coil, a magnetic field is generated by that activated primary coil, and
      a power supply for passing a current through the primary coils when activated to generate magnetic fields for each activated coil in a direction substantially perpendicular to a surface of the base unit;
   a communications interface that the base unit, and a receiver attached to, incorporated within, or coupled to a mobile device, battery, battery door, or skin use to communicate with each other during powering or charging, to
      verify the presence of the mobile device, battery, battery door, or skin associated therewith placed upon or close to the surface of the base unit,
      select and selectively switch, using their associated switching circuits to activate, a selection of the one or more primary coils which are determined to be most closely aligned with a receiver coil at the mobile device, battery, battery door, or skin associated therewith, and
      periodically exchange information for use with providing power transfer to the mobile device or battery;
   wherein the system is configured for use with a plurality of mobile devices or batteries capable of inductive powering or charging, each mobile device or battery comprising a receiver that is one of attached to, incorporated within, or coupled to that mobile device or battery, wherein the receiver comprises a receiver coil; and wherein the magnetic fields are used to inductively generate a current in the plurality of the receiver coils within the plurality of mobile devices or batteries placed close to the base unit, to charge or power the mobile devices or batteries.

21. The system of claim 1, wherein the communications interface enables communication of data between the base unit and the mobile device or battery.

22. The mobile device or battery of claim 13, wherein the communications interface enables communication of data between the mobile device or battery and the base unit.

23. The system of claim 1, wherein the receiver coil is integrated with an after-market or replacement unit, part, or battery pack, or is integrated into a plastic, leather, silicone, cloth or other material skin, cover or door for the mobile device, and plugs into or otherwise makes contact with power connections on the mobile device or battery.

24. The system of claim 1, wherein the receiver coil is integrated with an after-market or replacement unit, part, or battery pack, or provided as a replacement battery compartment door, battery attachment, or device skin, which includes the receiver coil.

25. The system of claim 1, wherein the coils in the base unit and the receiver are substantially aligned using one or more of a mechanical, magnetic, or optical method of alignment to provide optimum power transfer.

26. The system of claim 1, wherein the base unit and the mobile device or battery communicate with each other using one or more RFID or other radio frequency or optical communication that identifies the base unit, and the mobile device, battery, battery door, or skin.

27. The system of claim 1, wherein the system includes one or more light emitting diodes or audio signals that identify when charging or powering is being performed, or which ones of the primary coils are currently activated.

28. The system of claim 1, wherein the base unit determines the presence of the mobile device, battery, battery door, or skin by detecting a change in conditions of a resonant circuit in the base unit when the mobile device, battery, battery door, or skin is brought nearby.

29. The system of claim 1, wherein the communications interface enables communication of data by one or more of Bluetooth, WiFi, NFC, Felica, WiMAX, RFID, or other wireless or optical mechanism.

30. The system of claim 1, wherein the base unit is incorporated into a charging station or kiosk that allows a user to place a mobile device, that is enabled to receive power from the charging station kiosk, on the base unit to charge or power the device.

* * * * *